(12) United States Patent
Taniguchi et al.

(10) Patent No.: US 8,100,809 B2
(45) Date of Patent: Jan. 24, 2012

(54) AUTOMATIC TRANSMISSION

(75) Inventors: Takao Taniguchi, Toyota (JP);
Kazumasa Tsukamoto, Toyota (JP);
Masahiro Hayabuchi, Anjo (JP);
Akitoshi Katou, Takahama (JP); Satoru Kasuya, Aichi-ken (JP); Naoji Katou, Anjo (JP); Hiroshi Katou, Kariya (JP);
Masashi Kitou, Anjo (JP); Hiroaki Sanji, Nishio (JP); Naoki Takabayashi, Susona (JP)

(73) Assignee: Aisin AW Co., Ltd., Anjo-Shi, Aichi-Ken (JP)

( * ) Notice: Subject to any disclaimer, the term of this patent is extended or adjusted under 35 U.S.C. 154(b) by 604 days.

(21) Appl. No.: 11/658,912

(22) PCT Filed: Nov. 29, 2005

(86) PCT No.: PCT/JP2005/022250
§ 371 (c)(1),
(2), (4) Date: Nov. 12, 2008

(87) PCT Pub. No.: WO2006/059754
PCT Pub. Date: Jun. 8, 2006

(65) Prior Publication Data
US 2009/0264237 A1 Oct. 22, 2009

(30) Foreign Application Priority Data
Nov. 30, 2004 (JP) .................. 2004-345915

(51) Int. Cl.
*F16H 3/44* (2006.01)
*F16H 57/04* (2010.01)

(52) U.S. Cl. .................. 475/284; 475/159; 475/313

(58) Field of Classification Search .................. 475/116, 475/159, 269, 284, 285, 296, 330, 313
See application file for complete search history.

(56) References Cited

U.S. PATENT DOCUMENTS

| 5,106,352 | A | 4/1992 | Lepelletier |
| 5,542,889 | A | 8/1996 | Pierce et al. |
| 6,558,287 | B2 * | 5/2003 | Hayabuchi et al. ........... 475/271 |
| 7,052,433 | B2 | 5/2006 | Sugiura et al. |
| 7,059,995 | B2 * | 6/2006 | Stevenson ..................... 475/284 |
| 7,252,617 | B2 * | 8/2007 | Shim et al. .................... 475/275 |
| 7,267,630 | B2 * | 9/2007 | Tabata et al. .................. 475/275 |

(Continued)

FOREIGN PATENT DOCUMENTS

JP 2000-220704 A1 8/2000

(Continued)

*Primary Examiner* — Justin Holmes
*Assistant Examiner* — Michael Gonzalez
(74) *Attorney, Agent, or Firm* — Bacon & Thomas, PLLC

(57) ABSTRACT

A first element of a duplex planetary gear set is selectively coupled to an input shaft via a third clutch, or is selectively fixed via a first brake. A second element is selectively coupled, via a second clutch, to an intermediate shaft that is directly coupled to a speed-increasing element of a simplex planetary gear set which increases the rotational speed of the input shaft, or is selectively fixed via a second brake. A third element is directly coupled to an output shaft. A fourth element is selectively coupled to the input shaft via a first clutch. Therefore, by increasing the speed of the rotation of the input shaft by the simplex planetary gear set and transferring it to the duplex planetary gear set, it is possible to reduce the torques on individual components of an automatic transmission and therefore to reduce the sizes of the individual components and the capacities of the individual friction engagement elements.

21 Claims, 13 Drawing Sheets

U.S. PATENT DOCUMENTS

| | | | |
|---|---|---|---|
| 7,276,011 B2 * | 10/2007 | Tabata et al. | 475/276 |
| 7,300,383 B2 * | 11/2007 | Nozaki et al. | 477/131 |
| 7,628,726 B2 * | 12/2009 | Fukuyama et al. | 475/285 |
| 7,699,744 B2 * | 4/2010 | Lepelletier | 475/278 |
| 2002/0142880 A1 * | 10/2002 | Hayabuchi et al. | 475/275 |
| 2007/0060438 A1 * | 3/2007 | Fukuyama et al. | 475/269 |

FOREIGN PATENT DOCUMENTS

| | | |
|---|---|---|
| JP | 2001-082555 A1 | 3/2001 |
| JP | 2001-182785 | 7/2001 |
| JP | 2001-349388 | 12/2001 |
| JP | 2003-106440 | 4/2003 |
| JP | 2004-068918 | 3/2004 |

* cited by examiner

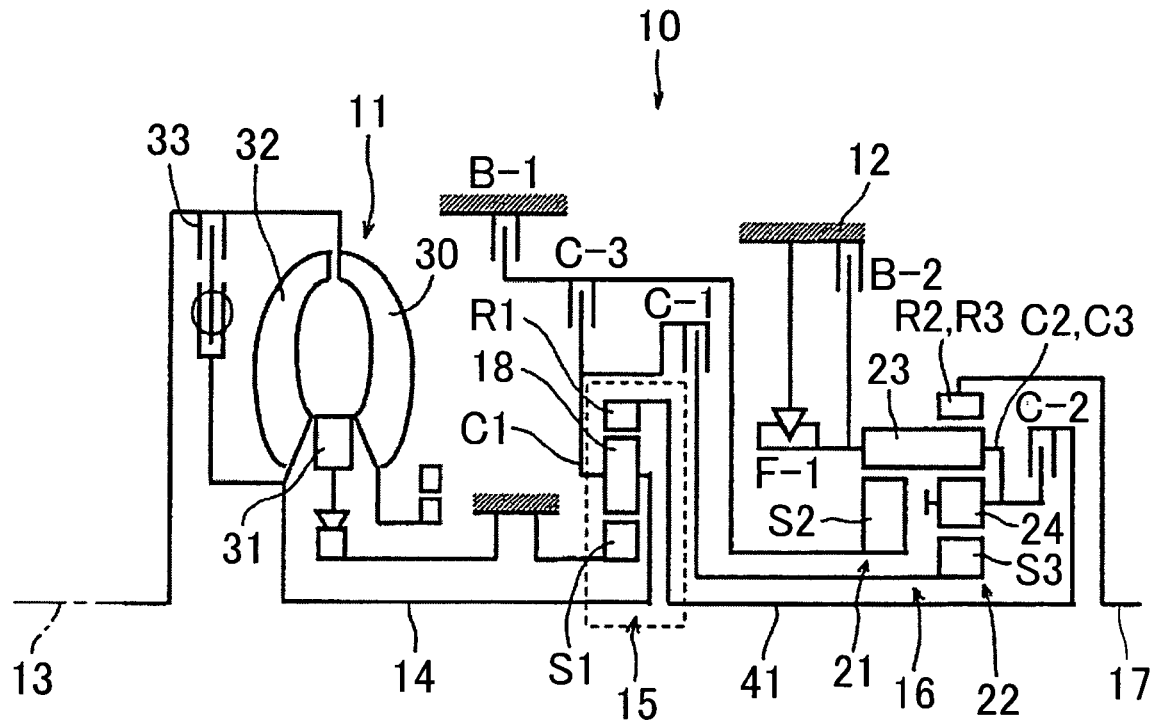

FIG.5

| | SPEED-INCREASING SIMPLEX PLANETARY GEAR | | | SPEED-CHANGING DUPLEX PLANETARY GEAR | | | |
|---|---|---|---|---|---|---|---|
| | S1 | C1 | R1 | S2 | C2,C3 | R2,R3 | S3 |
| 1st | 0.357 | 1.000 | 0.643 | | 1.667 | 2.667 | 1.000 |
| 2nd | 0.357 | 1.000 | 0.643 | 0.524 | 1.667 | 1.524 | 1.000 |
| 3rd | 0.357 | 1.000 | 0.643 | 0.344 | 1.094 | 1.000 | 0.656 |
| 4th | 0.099 | 0.278 | 0.179 | | 0.464 | 0.742 | 0.278 |
| 5th | 0.090 | 0.253 | 0.163 | 0.253 | 0.806 | 0.552 | |
| 6th | | | | 0.202 | 0.643 | 0.441 | |
| REV | 0.357 | 1.000 | 0.643 | 1.000 | 3.182 | 2.182 | |

FIG.6

| | C-1 | C-2 | C-3 | B-1 | B-2 | F-1 |
|---|---|---|---|---|---|---|
| 1st | 1.000 | | | | 1.667 | 1.667 |
| 2nd | 1.000 | | | 0.524 | | |
| 3rd | 0.656 | | 0.344 | | | |
| 4th | 0.278 | 0.464 | | | | |
| 5th | | 0.806 | 0.253 | | | |
| 6th | | 0.643 | | 0.202 | | |
| REV | | | 1.000 | | 3.182 | |

F I G . 9
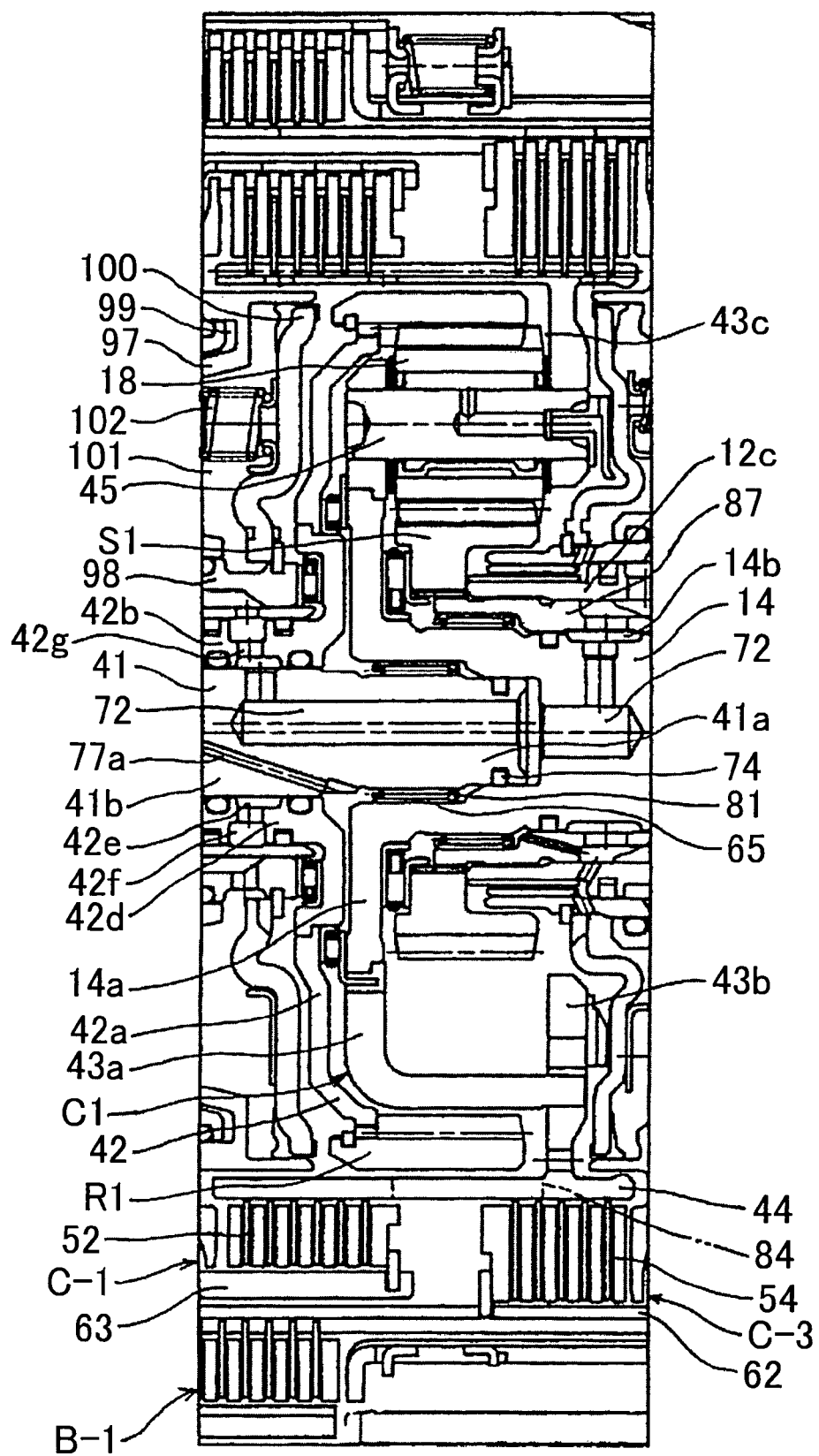

| | C-1 | C-2 | C-3 | B-1 | B-2 | F-1 | GEAR RATIO (3pinion) | STEP |
|---|---|---|---|---|---|---|---|---|
| 1st | ● | – | – | – | ▲ | ● | 4.148 | 1.75 |
| 2nd | ● | – | – | ● | – | – | 2.370 | 1.52 |
| 3rd | ● | – | ● | – | – | – | 1.556 | 1.35 |
| 4th | ● | ● | – | – | – | – | 1.155 | 1.34 |
| 5th | – | ● | ● | – | – | – | 0.859 | 1.25 |
| 6th | – | ● | – | ● | – | – | 0.686 | |
| REV | – | – | ● | – | ● | – | 3.394 | |

Condition of elements
● : Engaged
▲ : Engaged in Engine brake

TOTAL SPREAD 6.05

FIG. 16

|  | SPEED-INCREASING SIMPLEX PLANETARY GEAR | | | SPEED-CHANGING DUPLEX PLANETARY GEAR | | | |
|---|---|---|---|---|---|---|---|
|  | S1 | C1 | R1 | S2 | C2,C3 | R2,R3 | S3 |
| 1st | 0.556 | 1.556 | 1.000 |  | 2.593 | 4.148 | 1.556 |
| 2nd | 0.556 | 1.556 | 1.000 | 0.815 | 2.593 | 2.370 | 1.556 |
| 3rd | 0.556 | 1.556 | 1.000 | 0.535 | 1.701 | 1.556 | 1.021 |
| 4th | 0.155 | 0.433 | 0.278 |  | 0.722 | 1.155 | 0.433 |
| 5th | 0.141 | 0.394 | 0.253 | 0.394 | 1.253 | 0.859 |  |
| 6th |  |  |  | 0.314 | 1.000 | 0.686 |  |
| REV | 0.556 | 1.556 | 1.000 | 1.556 | 4.949 | 3.394 |  |

FIG. 17

|  | C-1 | C-2 | C-3 | B-1 | B-2 | F-1 |
|---|---|---|---|---|---|---|
| 1st | 1.556 |  |  |  | 2.593 | 2.593 |
| 2nd | 1.556 |  |  | 0.815 |  |  |
| 3rd | 1.021 |  | 0.535 |  |  |  |
| 4th | 0.433 | 0.722 |  |  |  |  |
| 5th |  | 1.253 | 0.394 |  |  |  |
| 6th |  | 1.000 |  | 0.314 |  |  |
| REV |  |  | 1.556 |  | 4.949 |  |

AUTOMATIC TRANSMISSION

TECHNICAL FIELD

The present invention relates to an automatic transmission in which elements of a simplex planetary gear set, coupled to an input shaft, are selectively connected to elements of a duplex planetary gear set via clutches and fixed via brakes for shifting, in which the speed of rotation of the input shaft is changed and output at an output shaft.

BACKGROUND ART

Japanese Patent Application Publication No. HEI 4-219553 discloses an automatic transmission that is provided with a simplex planetary gear set including a first ring gear coupled to an input shaft, a first sun gear fixed to the transmission case, and a first carrier that supports pinions that mesh with the first ring gear and the first sun gear, and a duplex planetary gear set having second and third sun gears, long pinions that directly mesh with the second sun gear and mesh with the third sun gear via intermediate pinions, a common carrier that supports the long pinions and the intermediate pinions, and a common ring gear that meshes with the long pinions. The common ring gear of the duplex planetary gear set is directly coupled to the output shaft, and the rotation of the first carrier of the simplex planetary gear set, reduced in rotational speed from that of the input shaft, is selectively transferred to the third and second sun gears of the duplex planetary gear set via first and third clutches, while the rotation of the input shaft is selectively transferred to the carrier of the duplex planetary gear set via a second clutch. The second sun gear and the common carrier of the duplex planetary gear set are selectively fixed via first and second brakes, respectively, thereby establishing six forward shift speeds and a reverse speed.

U.S. Pat. No. 5,542,889 describes, as shown in FIG. 1, an automatic transmission having a simplex planetary gear set 52 including a carrier 74 directly coupled to an input shaft 44, which is rotationally coupled to a crankshaft 14 of an engine, a sun gear 70 fixed to a transmission case 80, and a ring gear 72 that is rotated at a speed higher than that of the input shaft 44, and a duplex planetary gear set 50, 48 including a ring gear 64 and a carrier 58 which are directly coupled, and a carrier 66 and a ring gear 56 which are selectively connected via a clutch CL1. A sun gear 62 in the duplex planetary gear set 50, 48 is selectively connected to the carrier 74 of the simplex planetary gear set via a clutch CL3, or is fixed to the transmission case 80 via a brake B2. Reverse rotation of the carrier 66 is prevented by a one-way clutch 82. Reverse rotation of the ring gear 56, coupled to the carrier 66 via the clutch CL1, is prevented by a one-way clutch 82. The carrier 66 is selectively connected (coupled) to the ring gear 72 of the simplex planetary gear set 52 via the clutch CL2, and is selectively fixed to the transmission case 80 via a brake B1. The directly connected ring gear 64 and carrier 58 are directly coupled to an output shaft 90, and a sun gear 54 of the planetary gear set 48 is directly coupled to the input shaft 44.

The automatic transmission described in Japanese Patent Application Publication No. 2000-220704 is similar to that described in Japanese Patent Application Laid-Open Publication No. HEI 4-219553, but includes an input shaft 11 which is rotationally driven by an engine and which is divided into a forward half portion 11A and a rearward half portion 11B, which portions are spline-joined as shown in FIGS. 6 and 7. An oil passage 11p for supplying operating oil to a hydraulic servo 6, and a lubricating oil passage 11r for supplying lubricating oil to the elements disposed in a transmission case 10 are formed in parallel in the forward portion 11A. A lubricating oil passage 11s is formed in the forward portion 11B. The carrier C1 of simplex planetary gear set G1 is not coupled to the input shaft 11, but is coupled to the common hub 74 of first and third clutches C-1, C-3.

In the automatic transmissions described in Japanese Patent Application Publication No. HEI 4-219553 and Japanese Patent Application Publication No. 2000-220704, the output rotation of the engine is reduced in speed by the simplex planetary gear set and then input to the duplex planetary gear set. Therefore, an increased torque is transferred to the duplex planetary gear set. In particular, if the engine outputs high torque at relatively low speeds as in, for example, diesel engines, the transferred torque becomes even larger, and therefore it is necessary to increase the sizes of various components and to increase the capacities of clutches and brakes in order to cope with the high torque.

In order to solve the above-described problem, the automatic transmission described in of U.S. Pat. No. 5,542,889 increases the output speed of rotation of the engine by transfer through a simplex planetary gear set 52 and then through a duplex planetary gear set 48, 50. However, in the automatic transmission described in U.S. Pat. No. 5,542,889, the carrier 66 is prevented from reverse rotation by the one-way clutch 82, and the ring gear 56 is coupled to the carrier 66 by the clutch CL1 and is therefore prevented from rotating, so that the rotation of the input shaft 44 directly coupled to the sun gear 54 is reduced in speed, thereby achieving the first speed. Therefore, this automatic transmission is complicated in structure. In addition, in order to prevent rotation of the ring gear 56 that receives the reaction force for the first speed, where the transfer torque is large, there is a need to increase the capacity of the clutch CL1 that couples the ring gear 56 to the one-way clutch 82, resulting in an increased size of the apparatus.

SUMMARY OF THE INVENTION

Accordingly, the objective of the present invention is to provide an automatic transmission in which the rotation of the input shaft is increased in speed and then transferred to a duplex planetary gear set through a simplex planetary gear set, so that the torques assigned to individual portions of the automatic transmission are reduced and therefore the sizes of the individual components and the capacities of the friction engagement elements can be reduced.

In order to solve the aforementioned problem and achieve the above-stated objective, the present invention provides automatic transmission that shifts the rotation of an input shaft among a plurality of speeds and transfers the rotation to an output shaft by coupling or fixing elements of (1) a simplex planetary gear set coupled to the input shaft and (2) a duplex planetary gear set coupled to the output shaft, wherein the simplex planetary gear set comprises an input element directly coupled to the input shaft, a fixed element fixed to the transmission case, and a speed-increasing element that is rotated at a speed greater than that of the input shaft and that is directly coupled to an intermediate shaft. The duplex planetary gear set has first, second, third and fourth elements, which can be represented in a speed diagram arranged with intervals corresponding to gear ratios, wherein the first element is selectively connected to the input shaft via a third clutch and is selectively fixed via a first brake, wherein the second element is selectively connected to the intermediate shaft via a second clutch and is selectively fixed via a second brake, wherein the third element is directly coupled to the output shaft, and wherein the fourth element is selectively connected to the input shaft via a first clutch.

Since the rotation of the input shaft, rotationally coupled to the engine, is increased in speed by the simplex planetary gear set and is then input to the duplex planetary gear set, the torque transferred to the duplex planetary gear set is reduced, so that the sizes of the individual components and the capacities of the clutches and the brakes can be reduced. Therefore, merely by providing commonality of the duplex planetary gear set with a related-art gasoline engine-purpose automatic transmission (a sharing of components), wherein the rotation of the input shaft rotationally coupled to the gasoline engine is reduced in speed and then input to a duplex planetary gear set via a simplex planetary gear set, and by changing the speed reduction of the rotation of the input shaft via the simplex planetary gear set to a speed increase, an automatic transmission suitable for an engine that outputs higher torque at lower rotational speeds than related-art gasoline engines, e.g. a diesel engine, can easily be provided without increasing the sizes of individual components or the capacities of clutches and brakes. Furthermore, in the first speed where the transfer torque is large, rotation of the second element can be prevented without using a clutch. Therefore, the need for a clutch of large capacity is eliminated, and the automatic transmission can be reduced in size, weight and cost.

In the improved automatic transmission of the present invention, the input shaft and the output shaft are supported by the transmission case for rotation on a common axis, and the intermediate shaft is supported at its distal end within a journal hole formed in an end portion of the input shaft, so as to be rotatable coaxially with the input shaft.

Thus, in an automatic transmission in which the rotation of the input shaft rotationally coupled to the engine is increased in speed and is transferred to the intermediate shaft by the simplex planetary gear set, and the rotation of the intermediate shaft is shifted among a plurality of speeds and transferred to the output shaft by the duplex planetary gear set, the speed-increasing intermediate shaft is supported by an end portion of the input shaft for rotation relative thereto. Therefore, the intermediate shaft can be rotatably supported in a small space with a high rigidity.

In a second embodiment of the improved automatic transmission of the present invention, the intermediate shaft extends, from a distal end portion of the intermediate shaft, through an inner peripheral side of the duplex planetary gear set, to an end portion on the transmission case for rotation on the common axis. Accordingly, the speed-increasing intermediate shaft can be supported at both ends thereof on the transmission case in a small space with high rigidity.

In the preferred embodiments of the improved automatic transmission, the duplex planetary gear set is made up of two simplex planetary gear sets, and has four rotary elements including two different elements in one of the two simplex planetary gear sets always connected to two different elements of the other simplex planetary gear set.

Thus, with a simple design, the rotation of the input shaft can be shifted between six forward speeds and a reverse speed that are appropriately separated from one another, and then output at the output shaft.

In the preferred embodiments of the present invention, the simplex planetary gear set includes a first sun gear, a first carrier supporting a pinion that meshes with the first sun gear, and a first ring gear that meshes with the pinion, wherein the first carrier is the input element, the sun gear is the fixed element, and the first ring gear is the speed-increasing element. The duplex planetary gear set includes second and third sun gears, a long pinion that directly meshes with the second sun gear and meshes with the third sun gear via an intermediate pinion, a common carrier that supports the long pinion and the intermediate pinion, and a common ring gear that meshes with the long pinion, wherein the second sun gear is the first element, the common carrier is the second element, the common ring gear is the third element, and the third sun gear is the fourth element.

Accordingly, the second sun gear is selectively coupled to the first carrier via the third clutch, or is selectively fixed via the first brake. The common carrier is selectively coupled to the first ring gear via the second clutch, or is selectively fixed via the second brake. The common ring gear is directly coupled to the output shaft. The third sun gear is selectively coupled to the first carrier via the first clutch.

Accordingly, the present invention provides a compact structure of a reduced length, wherein the rotation of the input shaft can be shifted between six forward speeds and the reverse speed that are appropriately separated from each other.

In the preferred embodiments of the present invention, the first and third clutches are disposed in a vicinity of the simplex planetary gear set.

In a second embodiment of the present invention a carrier is the input element and is coupled via a member radially extending from an end portion of the input shaft. A sun gear is the fixed element and is coupled via an axially extending fixing member coupled to the transmission case, and a ring gear is the speed-increasing element. The ring gear and the intermediate shaft are coupled via a coupling member having a first portion that extends radially inward from the ring gear and a second portion that extends axially from the first portion, wherein the second portion is coupled to the intermediate shaft and has an oil passage that supplies oil pressure to a hydraulic servo of a friction engagement element. The coupling with the intermediate shaft is on the side of the oil passage which is axially opposite the support shaft at the distal end of the intermediate shaft. In this embodiment, the intermediate shaft is supported in a journal hole that is bored in the end portion of the input shaft, the oil passage in the axially extending portion of the coupling member is fit liquid-tight to the intermediate shaft, and the coupling member may be coupled to the intermediate shaft.

In another preferred embodiment, the fixing member coupled to the transmission case and extending in the axial direction is disposed around the outer periphery of the input shaft. The oil passage in the intermediate shaft is connected in communication with oil passages formed in the fixing member and the input shaft, and operating oil for the hydraulic servo is supplied via these oil passages. In this embodiment the length of the oil passage formed in the intermediate shaft can be shortened, as compared with a structure in which the coupling portion is disposed on the same axial side of the oil passage as the distal end of the intermediate shaft.

Further, a lubricating oil passage can be formed in the transmission case and the intermediate shaft without interference with the oil passage for supplying operating oil to the hydraulic servo. Furthermore, the length of the oil passage formed in the intermediate shaft for supplying the operating oil can be shortened in comparison with a structure in which the oil passage is disposed on the same axial side as the distal end of the intermediate shaft. Therefore, the lubricating oil passage length can be correspondingly increased to supply sufficient lubricating oil to the elements.

In the aforementioned first and second embodiments, the simplex planetary gear set includes a carrier that is the input element, a sun gear that is the fixed element, and a ring gear that is the speed-increasing element, and has a hub member that extends axially from the carrier at an outer periphery of the simplex planetary gear set, and the carrier and the hub member are formed as a single integral body. The carrier is formed of a carrier body and a carrier cover, and has a cutout for receiving a pinion formed in the carrier cover. Accordingly, pinions can easily be mounted within the carrier coupled to the input shaft, the number of components is reduced, the structure is simplified, and the operation of the friction engagement element is made smoother.

Preferably, a plurality of cutouts are formed in the carrier cover, point-symmetrically about the common axis, whereby the carrier becomes better rotationally balanced and can rotate without vibration.

In another preferred embodiment, the simplex planetary gear set includes a carrier that is the input element, a sun gear that is the fixed element, and a ring gear that is the speed-increasing element, and has a hub member that extends axially from the carrier at an outer periphery of the simplex planetary gear set, and the carrier and the hub member are separate components and are restricted in movements by a spline and a snap ring, respectively. In this embodiment, pinions can easily be mounted within the carrier coupled to the input shaft, through a window formed in the outer periphery of the carrier body.

In a modification of the foregoing embodiment, the simplex planetary gear set includes a carrier that is the input element, a sun gear that is the fixed element, and a ring gear that is the speed-increasing element, and has a hub member that extends axially from the carrier at the outer periphery of the simplex planetary gear set, and the carrier and the hub member are formed as a single integral body, and a hole for inserting the pinion is formed in the hub member.

Accordingly, pinions can easily be mounted within the carrier coupled to the input shaft, through the holes formed in the hub member and the windows in an outer periphery of the carrier body.

BRIEF DESCRIPTION OF THE DRAWINGS

FIG. 1 is a skeletal diagram showing an automatic transmission in accordance with the present invention;

FIG. 2 is a table of states of engagement of brakes and clutches, the gear ratios, and the steps in the shift speeds in the embodiment of FIG. 1;

FIG. 5 is a table of torque assignments to elements of the planetary gear sets;

FIG. 6 is a table showing torque assignments to friction engagement elements;

FIG. 9 is an enlarged sectional view of a simplex planetary gear set in the second embodiment;

FIG. 16 is a table of torque assignments to the elements of the planetary gear sets in the related-art automatic transmission of FIG. 13; and FIG. 17 is a table of torque assignments to the friction engagement elements in the related-art automatic transmission of FIG. 13.

DESCRIPTION OF PREFERRED EMBODIMENTS

Figure 3:
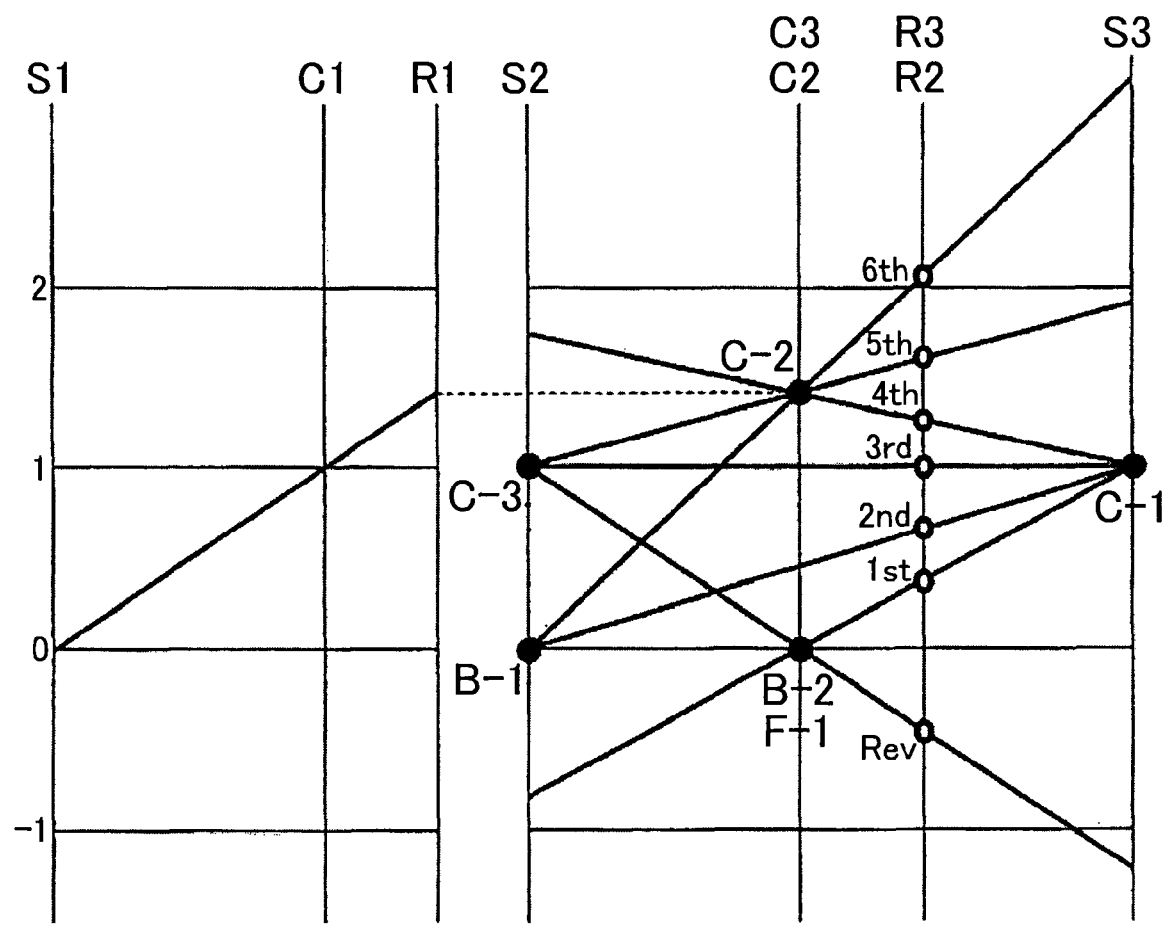
FIG. 3 is a speed diagram indicating the speed ratios of the elements of the planetary gear sets at the various shift speeds provided by the embodiment of FIG. 1.

Embodiments of the automatic transmission of the present invention will be described hereinafter with reference to the drawings. FIG. 1 shows an automatic transmission 10 in accordance with the present invention, which is used, for example, to shift the output speed of a fluid torque converter 11, that is rotationally driven by a diesel engine of a motor vehicle, and to transfer the rotation at the changed speed to drive wheels. The automatic transmission 10 includes an input shaft 14, the fluid torque converter 11, a simplex planetary gear set 15, a duplex planetary gear set 16, an output shaft 17, clutches C-1 to C-3, and brakes B-1, B-2 that are supported sequentially on a common axis 13 within a transmission case 12 attached to the body of a vehicle.

The simplex planetary gear set 15 includes a first sun gear S1 fixed to the case 12, a first carrier C1, which supports pinions 18 in mesh with the first sun gear S1 and which is directly coupled to the input shaft 14, and a ring gear R1 in mesh with the pinions 18. The first carrier C1 serves as an input element and is coupled to the input shaft 14. The first sun gear S1 (a fixed element) is fixed to the case 12. The first ring gear R1 serves as a speed-increasing element that increases the speed of the rotation of the input shaft 14.

The duplex planetary gear set 16 includes second and third sun gears S2, S3 that are rotatably supported on the common axis 13, long pinions 23 that directly mesh with the second sun gear S2 and that mesh with the third sun gear S3 via intermediate pinions 24, a common carrier C2, C3 that supports the long pinions 23 and the intermediate pinions 24, and a common ring gear R2, R3 that meshes with the long pinions 23.

The second sun gear S2 of the duplex planetary gear set 16 is selectively connected to the first carrier C1 of the simplex planetary gear set 15 via the third clutch C-3, and is selectively fixed to the case 12 via a first brake B-1. The common carrier C2, C3 is selectively to the first ring gear R1 via the second clutch C-2, and is selectively fixed to the case 12 via a second brake B-2. The common carrier C2, C3 is selectively coupled to the case 12 by a one-way clutch F-1 that is disposed in parallel with the second brake B-2, and therefore prevented from reverse rotation. The common ring gear R2, R3 is directly coupled to the output shaft 17. The third sun gear S3 is selectively connected to the first carrier C1 via the first clutch C-1.

The pump impeller 30 of the fluid torque converter 11 is rotationally driven by the engine to generate a flow of oil, and a stator 31 receives the reaction force of the oil flow and generates a torque on turbine 32. The input shaft 14 is directly coupled to the turbine 32. A lockup clutch 33, when engaged, directly couples the pump impeller 30 to the turbine 32.

The automatic transmission 10 described above is able to establish six forward speeds and a reverse speed by selectively coupling or fixing the input shaft 14, the output shaft 17, and the elements of the simplex planetary gear set 15 and the duplex planetary gear set 16 through selective engagement and disengagement of the first to third clutches C-1 to C-3 and selective actuation of the first and second brakes B-1, B-2. In FIG. 2, the circles provided in the columns for the clutches and the brakes indicate a coupled state for the clutches, and an engaged state for the brakes.

For the simplex planetary gear set 15 and a single-pinion planetary gear subset 21 of the duplex planetary gear set 16, the relationship between the rotational speed Ns of the sun gear, the rotational speed Nc of the carrier, the rotational speed Nr of the ring gear and the gear ratio λ of the single-pinion planetary gear subset is represented by the following equation (1). For a double-pinion planetary gear subset 22 of the duplex planetary gear set 16, the relationship between the rotational speed Ns of the sun gear, the rotation speed Nc of the carrier, the rotation speed Nr of the ring gear and the gear ratio λ of the double-pinion planetary gear subset is represented by the equation (2). The gear ratios for the individual shift speeds are computed on the basis of the equations (1) and (2). Where the numbers of teeth of the first to third sun gears S1, S2, S3 are Zs1, Zs2, Zs3 and the numbers of teeth of the first and common ring gears R1, R2 and R3 are Zr1, Zr, and Zr3 the gear ratios of the simplex planetary gear set 15, the single-pinion planetary gear subset 21 and the double-pinion planetary gear subset 22 may be expressed as λ1=Zs1/Zr1, λ2=Zs2/Zr2 and λ3=Zs3/Zr3.

$$Nr = (1+\lambda)Nc - \lambda Ns \quad (1)$$

$$Nr = (1-\lambda)Nc + \lambda Ns \quad (2)$$

By selective engagement of first to third clutches C-1 to C-3 and the first and second brakes B-1, B-2, the speed ratios of the elements of the simplex planetary gear set 15 and the duplex planetary gear set 16 become as indicated in the speed diagram of FIG. 3. In the speed diagrams, the elements of a planetary gear set, including the sun gear, the carrier and the ring gear, are arranged in the direction of the horizontal axis at intervals corresponding to the gear ratios, and the speed ratios for the various elements are plotted in the direction of the vertical axis. In FIG. 3, the speed diagrams of the simplex planetary gear set 15 and the duplex planetary gear set 16 are arranged side by side. In the duplex planetary gear set 16, the carrier C2, C3 and the ring gear R2, R3 of the single-pinion planetary gear subset 21 and the double-pinion planetary gear subset 22 are shared. Therefore, the speed ratios of the common carrier C2, C3 are indicated on a single vertical line designated C2, C3, and the speed ratios of the common ring gear R2, R3 are on a single vertical line designated R2, R3. As for the simplex planetary gear set 15, where the interval between the vertical line of the first carrier C1 and the vertical line of the sun gear S1 is assigned a value of "1", the vertical line of the ring gear R1 is spaced an interval λ1 from the vertical line of the first carrier C1, on the side opposite the vertical line of the sun gear S1. For the single-pinion planetary gear set 21, where the interval between the vertical line of the common carrier C2, C3 and the vertical line of the sun gear S2 is assumed to be "1", the vertical line of the common ring gear R2, R3 is spaced an interval λ2 from the vertical line of the common carrier C2, C3, on the side opposite the vertical line of the sun gear S2. As for the double-pinion planetary gear subset 22, where the interval between the vertical line of the common carrier C2, C3 and the vertical line of the sun gear S3 is assigned a value of "1", the vertical line of the common ring gear R2, R3 is disposed at a gear ratio λ3 from the vertical line of the common carrier C2, C3, on the same side as the vertical line of the sun gear S3. In the speed diagram, C-1 to C-3, and B-1 and B-2 indicate the points of selective actuation of the first to third clutches C-1 to C-3, and the first and second brakes B-1, B-2.

In the speed diagram for the duplex planetary gear set 16 as described above, the elements corresponding to the four vertical lines are designated the first, second, third and fourth elements, in that order from the extreme left vertical line. In this first embodiment, the second sun gear S2 of the duplex planetary gear set 16 is the first element, the common carrier C2, C3 is the second element, the common ring gear R2, R3 is the third element, and the third sun gear S2 is the fourth element.

Figure 4:
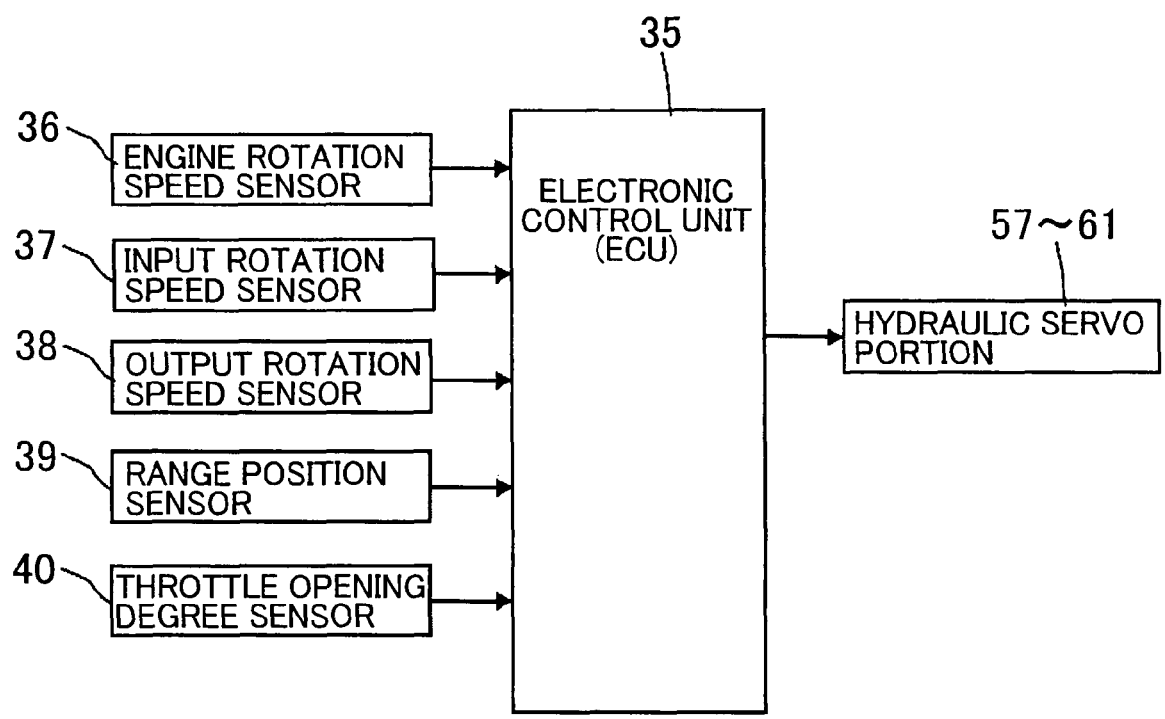
FIG. 4 is a block diagram of a control device.

A controller 35 for the automatic transmission 10 will now be described with reference to the block diagram of FIG. 4. Detection signals are input to the controller 35 (which includes a CPU), from an engine rotational speed sensor 36 that detects the engine-side rotational speed Ne of the torque converter 11 to which the rotational of the engine is transferred, from an input rotation speed sensor 37 that detects the rotational speed Ni of the input shaft 14 of the automatic transmission 10, from an output rotational speed sensor 38 that detects the rotational speed Nv of the output shaft 17 of the automatic transmission 10, from a range position sensor 39 that sends a signal D, N, or R which indicates the position of the shift lever at the drive range D, the neutral range N or the reverse range R, from a throttle opening sensor 40 that detects the amount of depression of an accelerator pedal Ss, etc. On the basis of these detection signals, the controller 35 selects an optimum shift speed, and outputs control currents to hydraulic servos 57 to 61 that actuate the clutches and the brakes to selectively engage or disengage the first to third clutches C-1 to C-3 and the first and second brakes B-1, B-2 as shown in FIG. 2, thus achieving six forward speeds and one reverse speed.

The first speed (1st) is achieved by engagement of the first clutch C-1 and automatic engagement of the one-way clutch F-1. The rotation of the first carrier C1 of the simplex planetary gear set 15 is input to the third sun gear S3 of the duplex planetary gear set 16 via the first clutch C-1, and the common carrier C2, C3 is prevented from reverse rotation by the one-way clutch F-1 and therefore receives the reaction force. Hence, the common ring gear R2, R3 and therefore the output shaft 17 rotate forward at the reduced rotational speed of the first speed gear ratio.

When engine braking is applied traveling downhill, the rotational speed of the common ring gear R2, R3, that is driven by the drive wheels, exceeds the rotational speed transferred from the engine side to the second sun gear S2, so that the direction of reaction force acting on the common carrier C2, C3 is reversed. Therefore, in engine braking, the common carrier C2, C3 is fixed by engagement of the second brake B-2 as indicated by ▲ in FIG. 2.

The second speed (2nd) is achieved by engagement of the first clutch C-1 and the first brake B-1. The rotation of the first carrier C1 of the simplex planetary gear set 15 which is directly coupled to the input shaft 14, is input to the third sun gear S3 of the duplex planetary gear set 16 via the first clutch C-1. The second sun gear S2 is fixed by the first brake B-1. Hence, the common ring gear R2, R3 and therefore the output shaft 17 rotate forward at the reduced rotational speed of the second speed gear ratio.

The third speed (3rd) is achieved by engagement of the first and third clutches C-1, C-3. The rotation of the first carrier C1, directly coupled to the input shaft 14, is input to the third and second sun gears S3, S2 of the duplex planetary gear set 16 via the first and third clutches C-1, C-3, so that the duplex planetary gear set 16 integrally rotates. Hence, the common ring gear R2, R3 and therefore the output shaft 17 rotate forward at a rotational speed equal to that of the input shaft 14, i.e. at the 1.0 gear ratio of the third speed.

The fourth speed (4th) is achieved by engagement of the first and second clutches C-1, C-2. The rotation of the first carrier C1 of the simplex planetary gear set 15 which is directly coupled to the input shaft 14 is input to the third sun gear S3 of the duplex planetary gear set 16 via the first clutch C-1. The rotation of the first ring gear R1, at a speed increased from that of the input shaft, is input to the common carrier C2, C3 via the second clutch C-2. Hence, the common ring gear R2, R3 and therefore the output shaft 17 rotate forward with the increased rotational speed of the gear ratio of the fourth speed.

The fifth speed (5th) is achieved by engagement of the second and third clutches C-2, C-3. The rotation of the first carrier C1 of the simplex planetary gear set 15, which is directly coupled to the input shaft 14, is input to the second sun gear S2 of the duplex planetary gear set 16 via the third clutch C-3. The rotation of the first ring gear R1, at a speed increased from that of the rotation of the input shaft 14, is input to the common carrier C2, C3 via the second clutch C-2. Hence, the common ring gear R2, R3 and therefore the output shaft 17 rotate forward at the increased rotational speed of the fifth speed gear ratio.

The sixth speed (6th) is achieved by engagement of the second clutch C-2 and the first brake B-1. The rotation of the first ring gear R1, at a speed increased from that of the rotation of the input shaft 14 of the simplex planetary gear set 15, is input to the carrier C2, C3 of the duplex planetary gear set 16 via the second clutch C-2. The second sun gear S2 is fixed via the first brake B-1. Hence, the ring gear R2, R3 and therefore the output shaft 17 rotate forward at the increased rotational speed of the sixth speed gear ratio.

The reverse speed (REV) is achieved by engagement of the third clutch C-3 and the second brake B-2. The rotation of the first carrier C1 of the simplex planetary gear set 15, which is directly coupled to the input shaft 14, is input to the second sun gear S2 of the duplex planetary gear set 16 via the third clutch C-3. The common carrier C2, C3 is fixed by the brake B-2. Hence, the common ring gear R2, R3 and therefore the output shaft 17 rotate in reverse at the reduced rotational speed of the reverse speed gear ratio.

If the gear ratios of the individual shift speeds are computed using equations (1) and (2), when the gear ratios $\lambda 1$, $\lambda 2$, $\lambda 3$ (the sun gear's number of teeth/the ring gear's number of teeth) of the simplex planetary gear set 15, the single-pinion planetary gear subset 21 and the double-pinion planetary gear subset 22 are set at, for example, 0.556, 0.458 and 0.375, the ratio of rotational speeds of the first carrier C1 and the common ring gear R2, R3, i.e. the gear ratios, for the individual shift speeds become the values given in FIG. 2, that is, 2.667 for the first speed, 1.524 for the second speed, 1.000 for the third speed, 0.742 for the fourth speed, 0.552 for the fifth speed, 0.441 for the sixth speed, and 2.182 for the reverse speed. The steps between the gear ratios are: 1.75 between the first and second speeds; 1.52 between the second and third speeds; 1.35 between the third and fourth speeds; 1.34 between the fourth and fifth speeds; and 1.25 between the fifth and sixth speeds. Thus, the step between gear ratios becomes appropriately smaller as the shift speed becomes higher. Hence, the automatic transmission of this embodiment provides gear ratios for six forward speeds and one reverse speed which are appropriately spaced.

In this case, the torques assigned to the first to third sun gears S1 to S3, the first carrier C1, the first ring gear R1, the common carrier C2, C3 and the common ring gear R2, R3 as well as the first to third clutches C-1 to C-3 and the first and second brakes B-1, B-2 are as shown in FIGS. 5 and 6.

Figure 7:
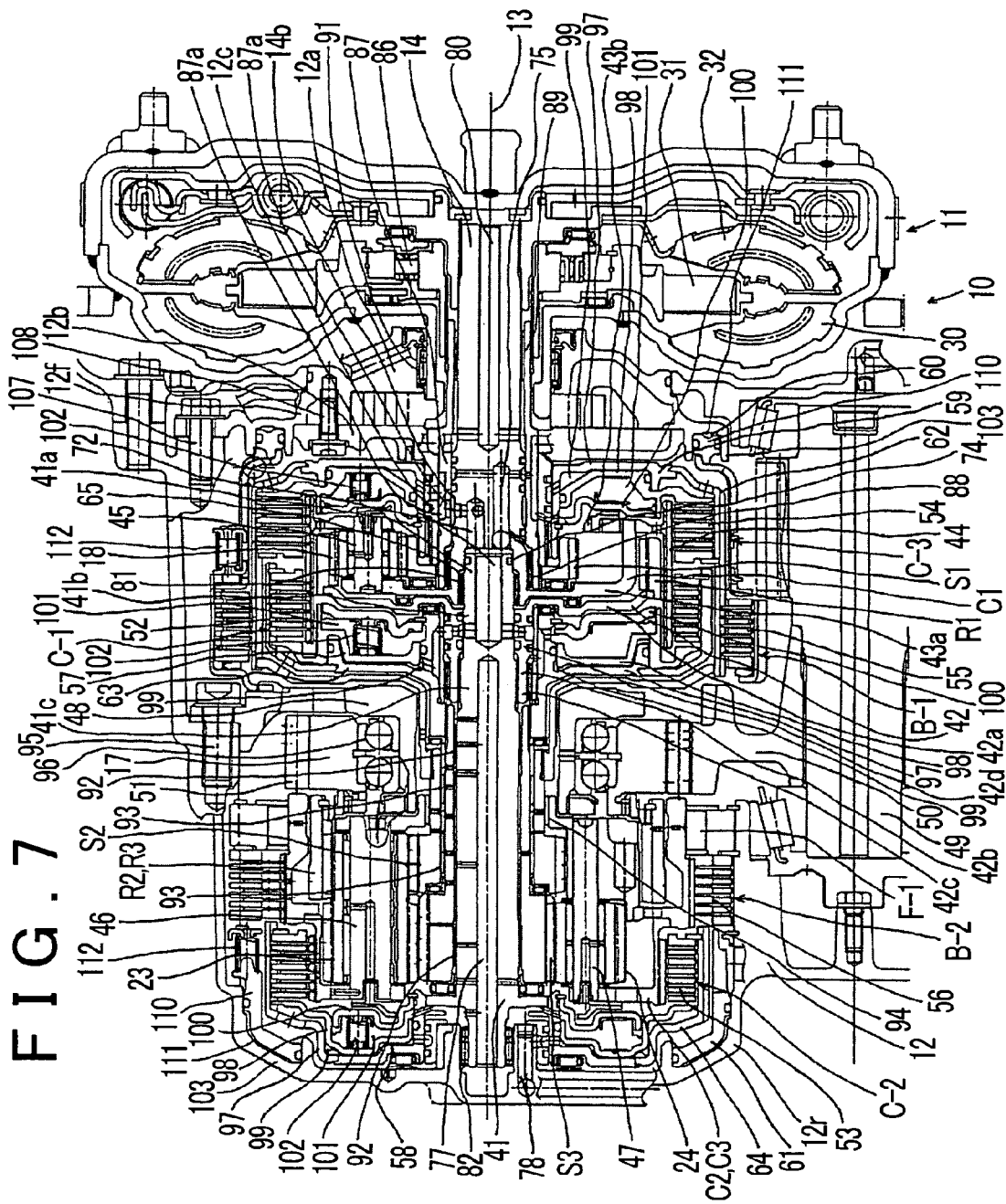
FIG. 7 is a sectional view showing a first embodiment in which the present invention is applied to an automatic transmission for an FF vehicle.

Next, the first embodiment of the invention, as applied to the automatic transmission 10 for an FF vehicle in which front wheels are driven by an engine mounted on the front side of the vehicle, will be described with reference to FIG. 7. The transmission case 12 has a rear case portion 12r in the shape of a bottomed cylinder, and a front wall portion 12f fixed forward of the rear case portion 12r. The front wall portion 12f is formed of an oil pump body 12a that is fixed to the transmission case 11 by bolts 107 and that houses an oil pump gear. An oil pump cover 12b fixed to the oil pump body 12a by bolts 108. The oil pump cover 12b has a boss portion 12c that extends axially from its inner periphery. A stator shaft 87 coupled to the stator 31 via a one-way clutch 86 is press-fitted and fixed to the inner peripheral surface of the boss portion 12c. The input shaft 14 is journaled on the stator shaft 87 via a needle bearing 88 and a metal bush 89 so as to be rotatable about the common axis 13. A journal hole 65 is provided in a rear side end of the input shaft 14. A support shaft 41a 41 is inserted and supported within the journal hole 65 via a needle bearing 81 for rotation relative to and coaxial with input shaft 14. A rear side end portion of the intermediate shaft 41 is rotatably supported via a needle bearing 82 in a bottom portion of the rear case 12r. The pump impeller 30 of the torque converter 11 is rotatably supported via a needle bush 91 on the oil pump body 12a. The stator 31 is coupled, via a one-way clutch 86, to the stator shaft 87 that is press-fitted into a boss portion of the oil pump cover 12b. The turbine 32 is fitted to the distal end of the input shaft 14 with relative rotation therebetween restricted. As used herein, the "forward" axial end of the automatic transmission 10 is the torque converter side, and the axial "rear" end is at the side of the duplex planetary gear set.

The first sun gear S1 of the simplex planetary gear set 15 is arranged on the common axis 13 and is fixed to the stator shaft 87 which, in turn, is press-fitted to the oil pump cover 12b. A carrier body 43a of the first carrier C1 is fastened to an input flange that protrudes from the end portion of the input shaft 14, and is thus directly coupled to the input shaft 14. The first ring gear R1 and the intermediate shaft 41 are coupled via a coupling member 42 in the form of a radially extended portion 42a that is integral with the first ring gear R1 and extends radially inward from the first ring gear R1, and an axially extended portion 42b that is integral with and extends axially from the radially extended portion 42a and that is spline-fitted to the intermediate shaft 41. Pinion shafts 45 rotatably support the pinions 18 that mesh with the first sun gear S1 and the first ring gear R1. The pinion shafts 45 are supported at both ends thereof by the carrier body 43a of the first carrier and a carrier cover 43b fixed to the carrier body 43a.

The third sun gear S3 of the duplex planetary gear set 16 is rotatably supported on the intermediate shaft 41 via two metal bushes 92. The second sun gear S2 is rotatably supported on an outer periphery of a cylindrical shaft portion of the third sun gear S3 via two metal bushes 93. The common carrier C2, C3 is rotatably supported, at its forward wall portion located on the torque converter side, on a cylindrical shaft portion of the second sun gear S2, via a metal bush 94. The long pinions 23 and the intermediate pinions 24 are rotatably supported via needle bushes on pinion shafts 46, 47, respectively, which are each supported at both ends by the common carrier C2, C3. The long pinions 23 are directly meshed with the second sun gear S2, and are meshed with the third sun gear S3 via the intermediate pinions 24, and also are meshed with the common ring gear R2, R3. A supported body 48 with a protruding central cylinder portion is fixed to the rear case 12r by a bolt 95, between the simplex planetary gear set 15 and the duplex planetary gear set 16. The output shaft 17 coupled to the common ring gear R2, R3, with relative rotation therebetween restricted, is supported on the central cylinder portion of the supported body 48, via a ball bearing 96.

The counter shaft 49 is rotatably supported in the transmission case 12, in parallel with the common axis 13. A driven gear 50 is fixed to the counter shaft 49 and is meshed with a drive gear 51 mounted on the output shaft 17. Differential drive pinions, smaller in diameter than the driven gear 50, are fixed to the counter shaft 49. The differential drive pinions are meshed with a differential ring gear of a not-shown differential device that transfers rotation of the output shaft 17 to the left and right front wheels of the vehicle.

In the transmission case 12, the first and third clutches C-1, C-3 and the first brake B-2 are provided adjacent to the simplex planetary gear set 15, and the second clutch C-2 and the second brake B-2 are provided adjacent to the duplex planetary gear set 16. The first to third clutches C-1 to C-3, and the first and second brakes B-1, B-2 function as friction engagement elements wherein a plurality of separator plates are selectively engaged with a plurality of friction discs. The friction engagement elements respectively include friction engagement portions 52 to 56 and hydraulic servo portions 57 to 61. Each friction engagement portion 52 to 56 includes a plurality of separator plates and a plurality of friction discs which are selectively engaged and which are spline-engaged for relative movement in the axial direction with restricted relative rotation. The separator plates and the friction discs are alternately arranged.

Hydraulic servo portions 57 to 59 of the first to third clutches C-1 to C-3 each include of a cylinder 97, a piston 98 disposed slidably in the cylinder 97, a servo chamber 99 formed oil-tight between the piston and the cylinder, a cancel plate 100, a cancel chamber 101 that is formed between the cancel plate and the piston for canceling the centrifugal force generated in the servo chamber by supply of cancel oil, and a compressed spring 102 that urges apart the separator plates and the friction discs.

Hydraulic servo portions 60, 61 of the first and second brakes B-1, B-2 each include a cylinder 103, a piston 110 disposed slidably in the cylinder 103, a servo chamber 111 formed oil-tight between the piston and the cylinder, and a compressed spring 112 that urges apart the separator plates and the friction discs.

A cylindrical hub member 44 is integrally formed on the outer periphery of the carrier cover 43b of the first carrier C1 of the simplex planetary gear set 15. A cylinder portion of a coupling member 62, coupled to the second sun gear S2 of the duplex planetary gear 16, is disposed around the outer periphery of the hub 44 of the third clutch C-3. The plurality of separator plates and the plurality of friction discs, forming the friction engagement portion 54 of the third clutch C-3, are spline-engaged with the inner peripheral surface of the cylinder portion and the outer peripheral surface of the hub member 44, respectively. The hydraulic servo portion 59 of the third clutch C-3 is provided on the coupling member 62, between the front wall portion 12f and the simplex planetary gear set 15. The separator plates and the friction discs (friction engagement portion 55) of the first brake B-1 are spline-engaged with the outer peripheral surface of the cylinder portion of the coupling member 62 and the inner peripheral surface of the rear case 12r, respectively. The hydraulic servo portion 60 of the first brake B-1, has its cylinder 103 formed by the oil pump body 12a. A cylinder portion of a coupling member 63, coupled to the third sun gear S3, surrounds the outer periphery of the hub 44. The separator plates and the friction discs of the friction engagement portion 52 of the first clutch C-1 are spline-engaged with the inner peripheral surface of the cylinder portion and the outer peripheral surface of the hub 44, respectively. The hydraulic servo portion 57 of the first clutch C-1 is formed in the coupling member 63.

A cylinder portion of a coupling member 64 fixed to the rear side end of the intermediate shaft 41 surrounds the outer periphery of the common carrier C2, C3 of the duplex planetary gear set 16. The separator plates and the friction discs of the friction engagement portion 53 of the second clutch C-2 are spline-engaged with the inner peripheral surface of the cylinder portion and the outer peripheral surface of the common carrier C2, C3, respectively. The hydraulic servo portion 58 of the second clutch C-2 is provided on the coupling member 64. The separator plates and the friction discs of the friction engagement portion 56 of the second brake B-2 are spline-engaged with the outer peripheral surface of the common carrier C2, C3 and an inner peripheral surface of the rear case portion 12r, respectively. The hydraulic servo portion 61 of the second brake B-2 is formed in a bottom portion of the rear case 12r. The one-way clutch F-1 is disposed between the outer peripheral surface of the common carrier C2, C3 and the inner peripheral surface of the rear case 12r.

A rear side end portion of the input shaft 14 and a front end portion of the intermediate shaft 41 are provided with an oil passage 72 that is open to the journal hole 65 for supply and discharge of operating oil to and from the servo chamber 99 of the hydraulic servo 57 of the first clutch C-1. A seal member 74 provides a seal between the journal hole 65 and the distal end of the intermediate shaft 41, preventing high-pressure operating oil from penetrating to the outer periphery of the intermediate shaft 41 and mixing with the lubricating oil. An oil passage 80, providing communication with the servo of a lockup clutch 33, is bored in a front end portion of the input shaft 14. An oil passage 78 that supplies operating oil to and discharges it from the hydraulic servo portion 58 of the second clutch C-2 is formed in a bottom portion of the rear case 12r. The intermediate shaft 41 and a rear end portion of the input shaft 14 have lubricating oil passages 75, 77 for supplying lubricating oil separately from the oil passage 72.

Figure 10:
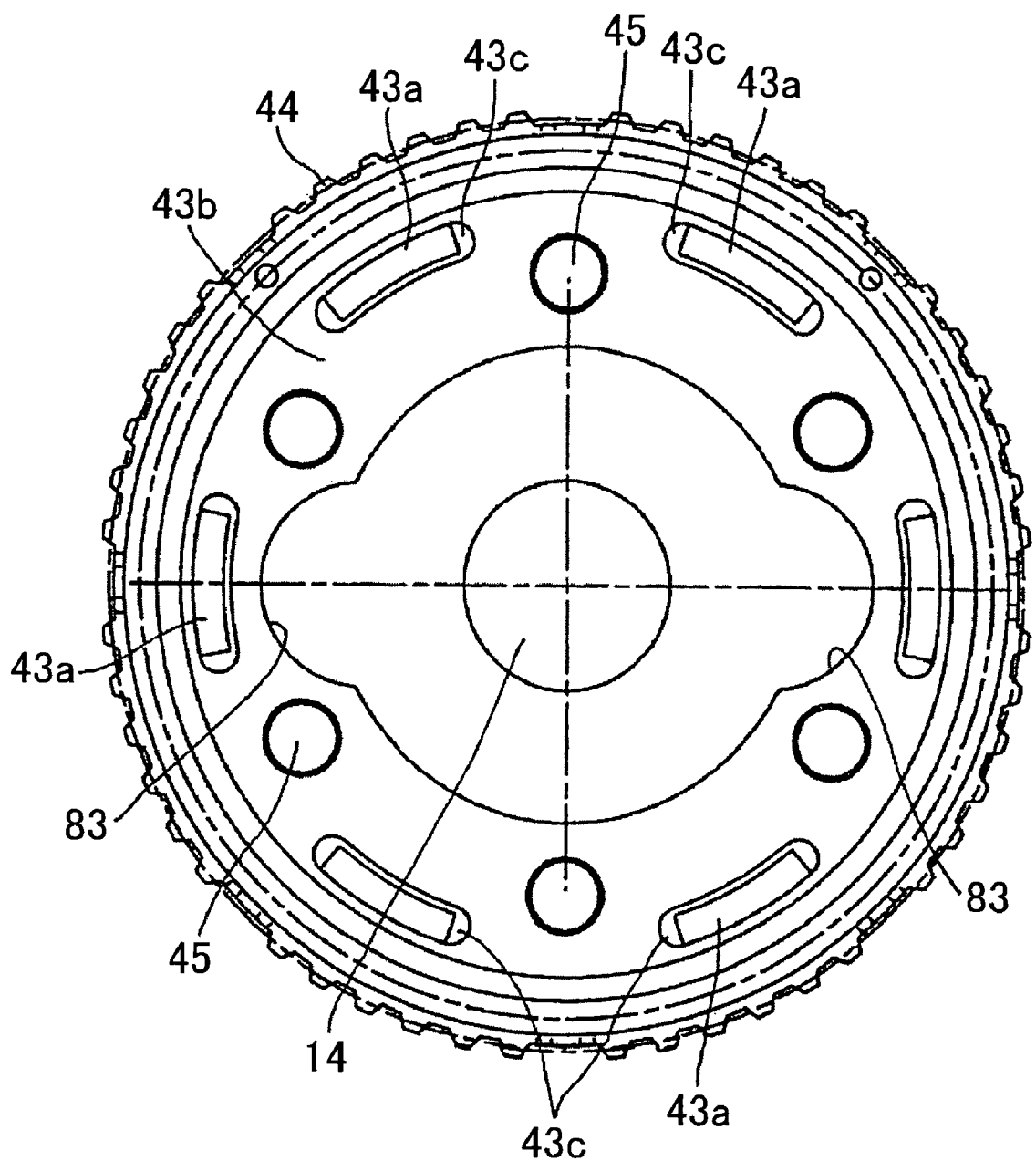
FIG. 10 is a view of a first carrier of the simplex planetary gear set shown in FIG. 9 viewed from the forward side.

Next, a second embodiment in which the present invention is applied to an automatic transmission for an FF vehicle, in which an engine is mounted on the vehicle front side and the front wheels are driven, will be described with reference to FIGS. 8 to 10. Components which are the same as in the foregoing automatic transmission 10 of the first embodiment are assigned the same reference numerals, and a detailed description thereof will be omitted.

A stator shaft 87 is press-fitted and fixed within a boss portion 12c extending axially rearward from the inner periphery of an oil pump cover 12b that forms a portion of a front wall 12f of a transmission case 12. An input shaft 14 is journaled within the boss portion 12C via a needle bearing 88 and a metal bush 89 so as to be rotatable about a common axis 13. A journal hole 65 is provided in the rear end portion of the input shaft 14. A support shaft portion 41a, formed at a distal end of an intermediate shaft 41, is mounted in the journal hole 65 via a needle bearing 81 so as to be coaxially rotatable therein. The intermediate shaft 41 extends through duplex planetary gear set 16, and extends out on the rear side. A rear end portion of the intermediate shaft 41 is journaled in a bottom portion of a rear case portion 12r of the transmission case 12 via a needle bearing 82 so as to be rotatable on the common axis 13.

The simplex planetary gear set 15 includes a first sun gear S1 fixed to the transmission case 12, a first ring gear R1 coupled to the intermediate shaft 41, and a first carrier C1 that is fixed to the input shaft 14 and that rotatably supports pinions 18 which mesh with the first sun gear S1 and the first ring gear R1. The first sun gear S1 is spline-fitted and fixed to the stator shaft 87 which, in turn, is press-fitted and fixed in the boss portion 12c which extends axially rearward from the inner periphery of the oil pump cover 12b.

The first ring gear R1 and the intermediate shaft 41 are coupled via a coupling member 42 that has a radially extended portion 42a that extends radially inward from an outer periphery that is spline-fitted to the first ring gear R1, and an axially extended portion 42b that extends axially from the radially extended portion 42a and that is spline-fitted to the intermediate shaft 41. The axially extended portion 42b is provided with a coupling portion 42c spline-fitted to the intermediate shaft 41, and a supply portion 42d for supply of oil pressure to a hydraulic servo of a friction engagement element, that is, in this embodiment, a servo chamber 99 of the hydraulic servo 57 that engages and disengages a friction engagement portion 52 of a first clutch C-1. The coupling portion 42c is disposed on the axially opposite side of the supply portion 42d relative to the simplex planetary gear set 15. A support shaft 41a, a supply shaft 41b covering to the supply portion 42d, and a spline shaft portion 41c spline-fitted to a coupling portion 42c form the intermediate shaft 41, are arranged sequentially from the distal end, with the diameter increasing stepwise.

The first carrier C1 is provided with a carrier body 43a that is fastened by welding or the like to an input flange portion 14a which extends radially from a rear end portion of the input shaft 14. The carrier body 43a extends in a radial direction, and is bent at an outer edge to extend axially over a length that is slightly greater than the width of the pinions 18. An annular carrier cover 43b is integrally fixed to a front end of an outer peripheral portion of the carrier body 43a by welding or the like. A plurality of (six in FIG. 10) pinion shafts 45 are supported at both ends by the carrier body 43a and the carrier cover 43b, in parallel with the input shaft 14. Pinions 18 are rotatably supported on input shaft 14. The pinions 18 mesh with the first sun gear S1, and also mesh with the first ring gear R1 via window portions 43c that are formed in the outer periphery of the carrier body 43a.

At an outer periphery of the first ring gear R1 is a cylindrical hub member 44 shared by the first and third clutches C-1, C-3. The hub member 44 is formed integrally with the outer periphery of the carrier cover 43b. A plurality of separator plates and a plurality of friction discs, constituting the friction engagement portions 52, 55 of the first and third clutches C-1, C-3, are spline-engaged with an outer peripheral surface of the hub member 44 and with inner peripheral surfaces of cylinder portions of coupling members 63, 62, respectively, as in the case of the first embodiment. Through engagement and disengagement of the friction engagement elements by hydraulic servos 57, 59, the first carrier C1 is disengageably coupled to third and second sun gears S3, S2 of the duplex planetary gear set 16 via the coupling members 63, 62.

Since the first carrier C1 is formed integrally with the input shaft 14 and the hub member 44 is formed integrally with the carrier cover 43b, it is impossible to insert the pinions 18 into the first carrier C1 through the windows 43c formed in the outer periphery of the carrier body 43a and to fit the pinions 18 on pinion shafts 45. Therefore, in this second embodiment, cutouts 83 for inserting the pinions 18 are formed in a small diameter-side inner peripheral surface of the carrier cover 43b. The plurality of pinions 18 are sequentially inserted into the carrier C1 through spaces between the cutouts 83 and the outer peripheral surface of the input shaft 14. A pinion shaft 45 is fitted into the center hole of each of the pinions 18 via bushes and the pinion shaft 45 is then inserted into support holes bored in the carrier body 43a and the carrier cover 43b. The pinion shaft 45 is then fixed in the support hole of the carrier body 43a by caulking or the like. A plural number of cutouts 83 are formed in the small diameter-side inner peripheral surface of the carrier cover 43b, point symmetrically about the common axis 13. Thus, the first carrier C1 has good rotational balance, and is able to smoothly rotate without vibrating.

While in the above embodiment, the cutouts 83 are formed on the inner peripheral surface of the carrier cover 43b in order to allow mounting of the pinions 18, instead of the cutouts 83, holes 84 for inserting the pinions 18 may be formed in alignment with the window portions 43c formed in the outer periphery of the carrier body 43a of the hub member 44, as shown by imaginary lines in FIG. 9. According to this alternative, the pinions 18 are inserted into the first carrier C1 through the holes 84 and the window portions 43c, and are supported on the pinion shafts 45 via bushes.

Figure 8:
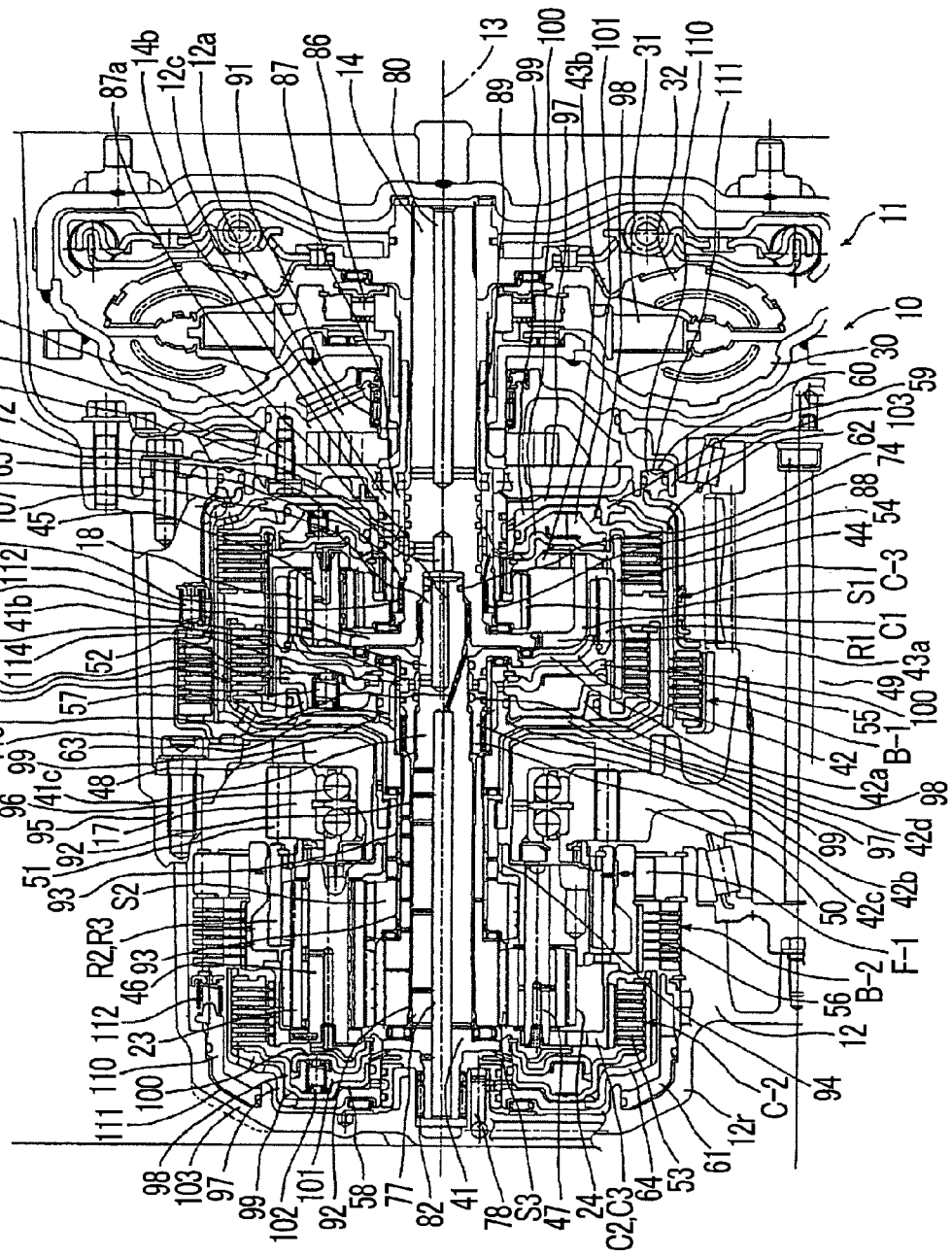
FIG. 8 is a sectional view showing a second embodiment in which the present invention is applied to an automatic transmission for an FF vehicle.

As shown in FIGS. 8 and 9, the stator shaft 87 is press-fitted and fixed within the boss 12c which extends axially rearward from the inner peripheral portion of the oil pump cover 12b and is provided with an oil passage 87a for supplying operating oil to and discharging it from the servo chamber 99 of the hydraulic servo. The oil passage 87a is connected in communication with an annular groove 14b formed on the outer periphery of the input shaft 14. An oil passage 72 is connected at one end in communication with (open to) the annular groove 14b and opens at its other end to a bottom surface of the journal hole 65 bored in the input shaft 14. An oil passage 72', open at one end to the distal end surface of the intermediate shaft 41 and open at its other end to the outer peripheral surface of the supply shaft portion 41b, is bored in a distal end portion of the intermediate shaft 41. An inner peripheral surface of the supply member 42d is provided with an annular groove 42e that is in communication with the oil passage 72' and that is sealed at both sides thereof. The outer peripheral surface of the supply member 42d is provided with an annular groove 42f in communication with an oil passage 113. The oil passage 113 is formed in a boss portion which extends axially toward the torque converter from the inner periphery of a coupling member 63 that forms the drum (cylinder) of the first clutch. The oil passage 113 is in communication with the servo chamber 99 of the first clutch, via an oil passage 114 formed in a sleeve press-fitted in a boss portion forming the inner peripheral surface of the drum. The annular groove 42f is sealed at both sides thereof. Furthermore, the annular groove 42e and the annular groove 42f are connected via a radial oil passage 42g. Therefore, the annular grooves 42e, 42f are in communication with the oil passage 72, 72' that supplies operating oil to and discharges it from the servo chamber 99 of the hydraulic servo 57 of the first clutch C-1. Thus, oil passages for supplying operating oil to hydraulic servos are formed in the transmission case 12, the input shaft 14 and the intermediate shaft 41. While not shown in the drawings, the oil passage 87a formed in the stator shaft 87 is connected to a hydraulic control apparatus which controls the oil supplied as operating oil to the servo chambers of the hydraulic servos.

A lubricating oil passage is open to a bush hole in a bottom portion of the rear case portion 12r in which is fitted a needle bearing 82 that supports the rear end of the intermediate shaft 41. In the intermediate shaft 41, a lubricating oil passage 77 extends axially from the end surface of intermediate shaft 41 to the vicinity of the oil passage 72'. From a distal end of the lubricating oil passage 77, a lubricating oil passage 77a of a small diameter is bored at an incline so as not to interfere with the oil passage 72'. The lubricating oil passage 77a extends through the supply shaft portion 41b, and opens at the outer peripheral surface of the support shaft portion 41a. The lubricating oil supplied from the lubricating oil passage 77a lubricates elements, such as a needle bearing 65 located between the coupling member 42 and the first carrier C1 of the simplex planetary gear set 15, and the like. Thus, lubricating oil passages for supplying lubricating oil to elements disposed within the transmission case 12 are formed in the transmission case 12 and in the intermediate shaft 41.

Figure 11:
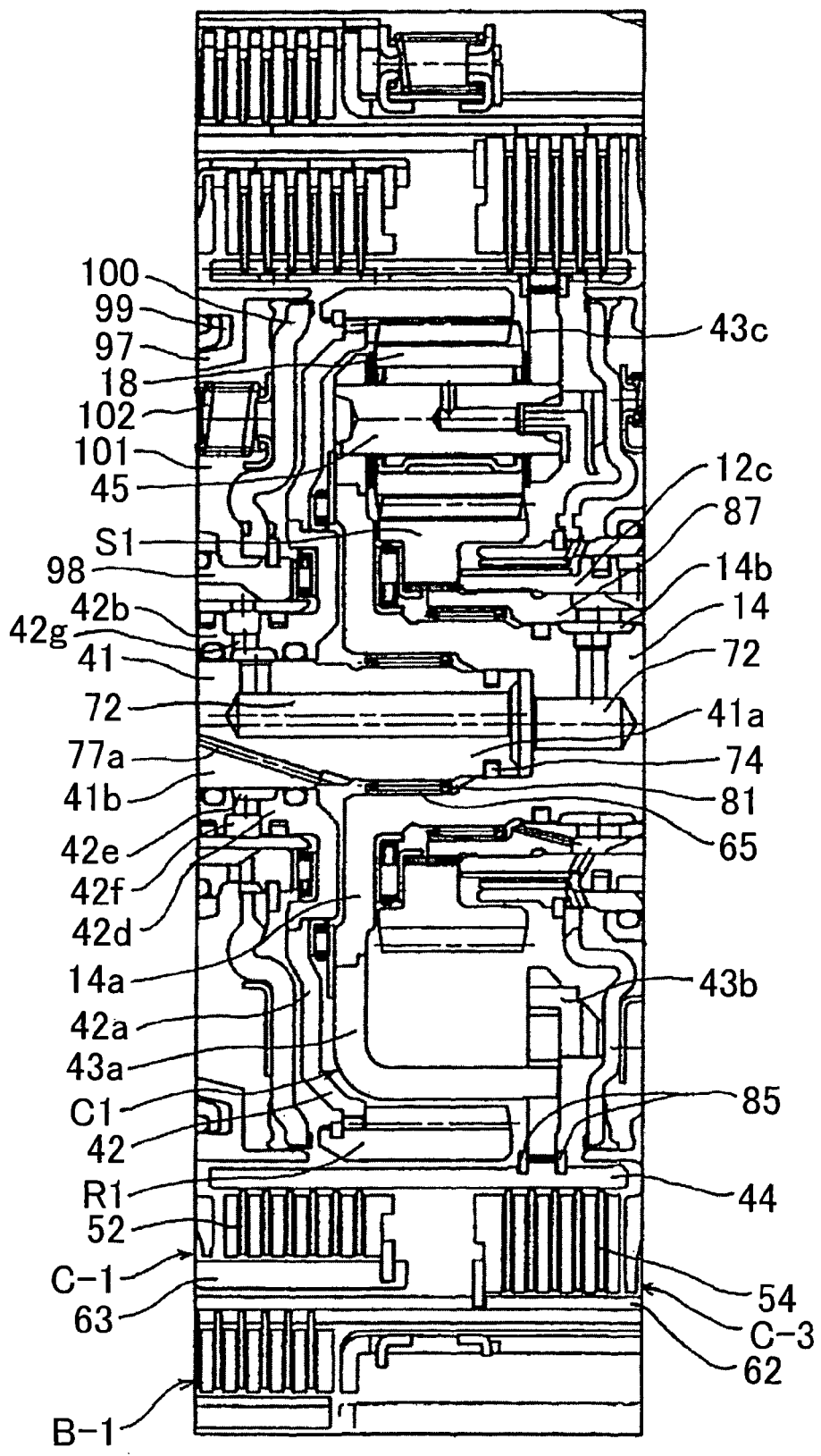
FIG. 11 is an enlarged sectional view showing a third embodiment of the simplex planetary gear set.

In a third embodiment shown in FIG. 11, a first carrier C1 and a hub 44 are formed as separate members. Splines formed on the inner periphery of hub 44 are in mesh with splines on the outer periphery of carrier cover 43b to restrict relative rotation therebetween. Two snap rings 85 are placed in two annular grooves at opposite sides of the carrier cover 43b on the inner peripheral surface of the hub member 44, so that the hub member 44 is restricted in axial movement with respect to the first carrier C1.

In the third embodiment, before the hub member 44 is attached to the first carrier C1, the pinions 18 are inserted into the first carrier C1 through windows 43c formed in an outer periphery of the carrier body 43a, and are supported by pinion shafts 45 via bushes. The hub member 44 is then spline-fitted to the carrier cover 43b, and held in place by the snap rings 85.

Figure 12:
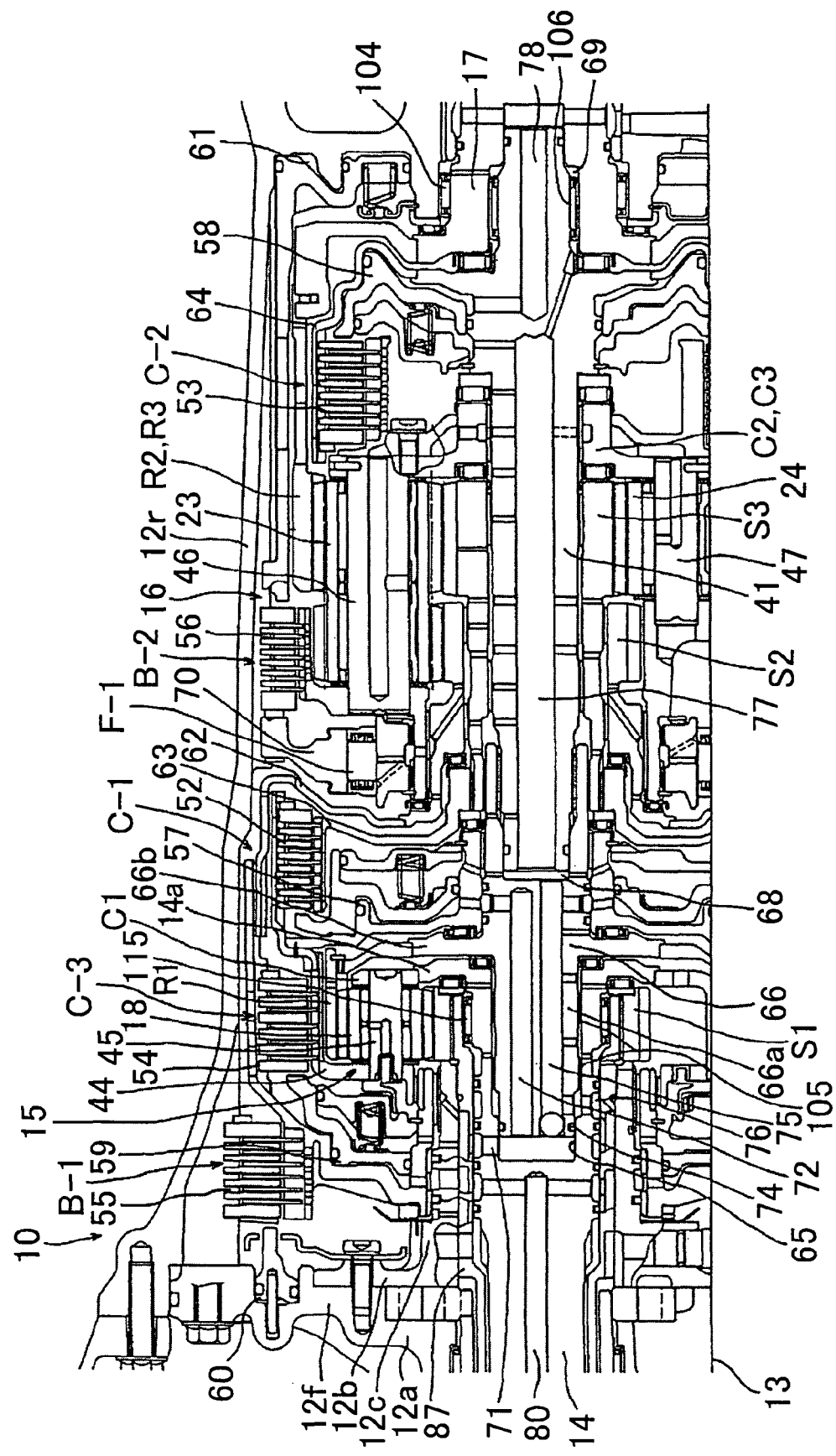
FIG. 12 is a sectional view showing a fourth embodiment in which the present invention is applied to an automatic transmission for an FR vehicle.

Next, a fourth embodiment, in which the present invention is applied to an automatic transmission for an FR vehicle wherein an engine is mounted in the front of the vehicle and rotation of the engine is transferred to and drives the rear wheels, will be described with reference to FIG. 12. The features which are the same as in the above-described automatic transmission 10 are assigned the same reference numerals, and detailed description thereof will be omitted.

A stator shaft 87 is press-fitted and fixed within a boss 12c which extends axially rearward from an inner peripheral portion of an oil pump cover 12b that constitutes a portion of front wall 12f of transmission case 12. Input shaft 14 is journaled within stator shaft 87 so as to be rotatable on a common axis 13 via a needle bearing 115 and a not-shown metal bush. An output shaft 17 is supported by the rear case via a needle bush 104 so as to be rotatable on the common axis 13. The output shaft 17 extends rearward from the transmission case 12, and is rotationally coupled, via a propeller shaft, to a differential ring gear of a not-shown differential device that transfers rotation to the left and right rear wheels of the vehicle.

A cylinder portion of a coupling member 62 is coupled to a second sun gear S2 of a duplex planetary gear set 16 and is disposed at the outer periphery of a cylinder portion of an engagement member 44 that constitutes a first carrier C1 of a simplex planetary gear set 15. A plurality of friction discs and a plurality of separator plates are alternatively arranged to form a friction engagement portion 54 of a third clutch C-3 and are respectively spline-engaged with an inner peripheral surface and an outer peripheral surface of the two cylinder portions. A cylinder portion of a coupling member 63 is coupled to a third sun gear S3 and is disposed at the inner periphery of a cylinder portion of the engagement member 44. A plurality of separator plates and a plurality of friction discs are alternatively arranged to form the friction engagement portion 52 of first clutch C-1 and are respectively spline-engaged with an outer peripheral surface and an inner peripheral surface of the two cylinder portions.

A journal hole 65 is provided in the rear end of the input shaft 14. A shaft portion 66a of an intermediate member 66 is supported within the journal hole 65 via two metal bushes 105 for rotation relative to and coaxially with the input shaft 14. A distal end of the intermediate shaft 41, coaxial with the intermediate member 66, is splined within and a coupling hole 68 formed in a rear end portion of the intermediate member 66 so as to be incapable of relative rotation. The rear end of the intermediate shaft 41 is supported within a hole 69 bored in a distal end of the output shaft 17, via a needle bearing 106, so as to be rotatable on the common axis 13. In this embodiment, the "intermediate shaft" may be considered to be the combination of the intermediate shaft 41 and the intermediate member 66. The first ring gear R1 is directly coupled to the intermediate member 66 through spline-fitting to a speed-increasing flange portion 66b that extends radially from the intermediate member 66. On an inner peripheral surface of the rear case portion 12r, an annular body 70 is fixed forward of the friction engagement portion 56 of the second brake B-2. A one-way clutch F-1 is disposed between the annular body 70 and the outer peripheral surface of the common carrier C2, C3.

Oil passages 72, 78, 80, for supplying operating oil to and discharging it from hydraulic servos 57, 58 of first and second clutches C-1, C-2 and a hydraulic servo of a lockup clutch 33, are formed in the shaft portion 66a of the intermediate member 66, a rear end portion of the intermediate shaft 41, and the input shaft 14. Lubricating oil passages 75, 77 for supplying lubricating oil to various portions are bored separately from oil passages 72, 78, in the shaft portion 66a of the intermediate member 66 and the intermediate shaft 41.

In the automatic transmission 10, both that for FF vehicles and that for FR vehicles, the first and third clutches C-1, C-3 are disposed in the vicinity of the simplex planetary gear set 15. Therefore, merely by achieving commonality, i.e. a sharing of a portion of the duplex planetary gear set 16 with a related-art gasoline engine automatic transmission, and changing the speed reduction of the input shaft via the simplex planetary gear set to a speed increase, an automatic transmission suitable for an engine that outputs higher torque at lower rotational speeds than related-art gasoline engines, for example a diesel engine, is provided.

Figures 13, 14:
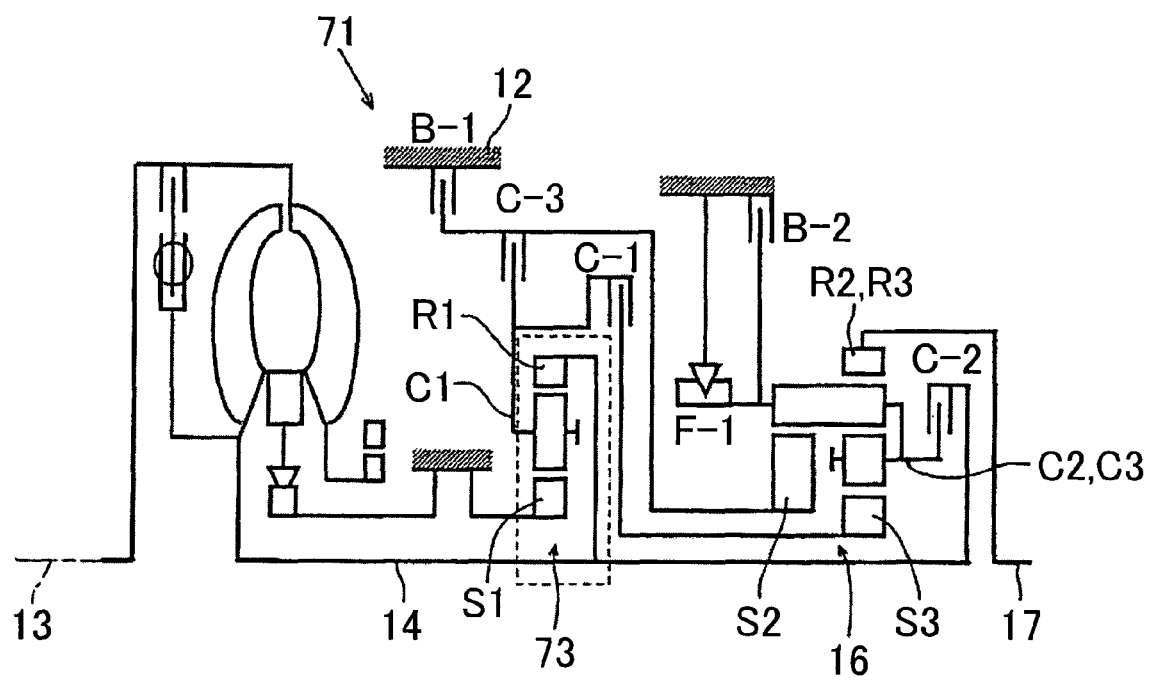
FIG. 13 is a skeletal diagram of a related-art automatic transmission for a gasoline engine.
FIG. 14 is a table of the states of engagement of brakes and clutches, the gear ratios, and the steps in the related-art gasoline engine-purpose automatic transmission of FIG. 13.

A related-art gasoline engine automatic transmission 71, as shown in FIG. 13, includes an input shaft 14, a torque converter 11, a simplex planetary gear set 73, a duplex planetary gear set 16, an output shaft 17, clutches C-1 to C-3, and brakes B-1, B-2 which are sequentially supported on a common axis 13 within a transmission case 12. A first sun gear S1 of the simplex planetary gear set 73 is fixed, and the input shaft 14 is directly coupled to a first ring gear R1. A second sun gear S2 of the duplex planetary gear set 16 is selectively connected to a first carrier C1 of the simplex planetary gear set 73 via the third clutch C-3, and is selectively fixed to the case 12 via the first brake B-1. A common carrier C2, C3 is selectively connected to the input shaft 14 via the second clutch C-2, and is selectively fixed to the case 12 via the second brake B-2. The common carrier C2, C3 is designed to be coupled to the case 12 via a one-way clutch F-1 disposed in parallel with the second brake B-2, so as to be prevented from reverse rotation. A common ring gear R2, R3 is directly coupled to an output shaft 17. A third sun gear S3 is selectively connected to the first carrier C1 via the first clutch C-1.

Therefore, by dividing the input shaft 14 of the related-art gasoline engine automatic transmission 71 into the input shaft 14 and the intermediate shaft 41 so that they are capable of relative rotation, by directly coupling the first carrier C1 of the simplex planetary gear set 73 to the input shaft 14, by directly coupling the first ring gear R1 to the intermediate shaft 41, and by fixing the first sun gear S1, it is possible to make an automatic transmission suitable for an engine that outputs higher torque at lower rotational speeds than a related-art gasoline engine, for example a diesel engine, while sharing a large portion of the related-art gasoline engine automatic transmission 71 without increasing the sizes of various components or the capacities of clutches or brakes.

Figure 15:
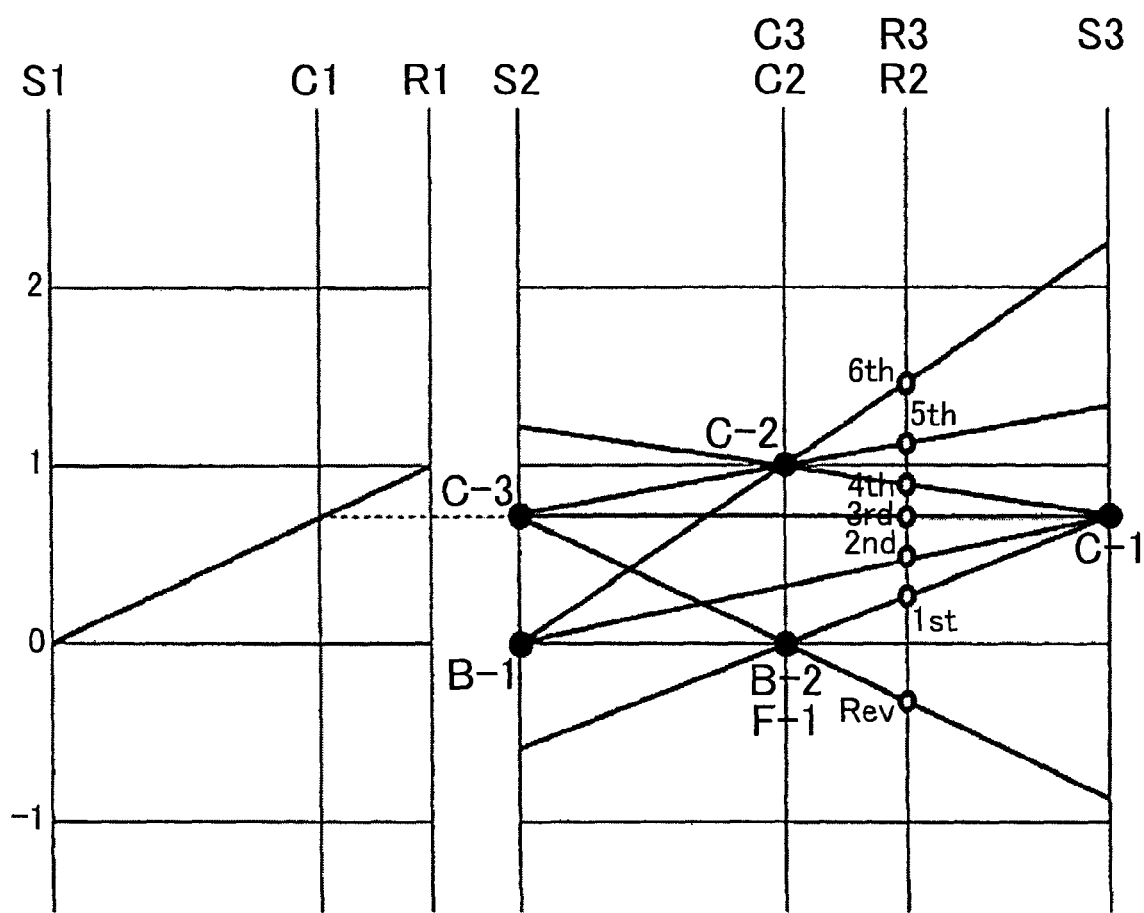
FIG. 15 is a speed diagram giving the speed ratios of the elements of the planetary gear sets, at the individual shift speeds in the related-art automatic transmission of FIG. 13.

The related-art gasoline engine automatic transmission 71, as shown in FIG. 13, achieves six forward speeds and one reverse speed by selectively engaging and disengaging the first to third clutches C-1 to C-3 and the first and second brakes B-1, B-2 in substantially the same manner as in the automatic transmission 10 in accordance with the present invention. If the gear ratios λ1, λ2, λ3 of the simplex planetary gear set 73, the single pinion planetary gear subset 21, and the double pinion planetary gear subset 22 are 0.556, 0.458, and 0.375, respectively, the gear ratios at the individual shift speeds, and the steps between gear ratios are as shown in the columns with the headings GEAR RATIO and STEP in FIG. 14. In this case, the speed ratios of the individual elements of the simplex planetary gear set 73 and the duplex planetary gear set 16 are as indicated in the speed diagram shown in FIG. 15. The torques assigned to the first to third sun gears S1 to S3, the first carrier C1, the first ring gear R1, the common carrier C2, C3, and common ring gear R2, R3, as well as the first to third clutches C-1 to C-3 and the first and second brakes B-1, B-2, are as shown in FIGS. 16 and 17.

The automatic transmission 10 in accordance with the present invention, as compared with the related-art gasoline engine automatic transmission 71, achieves a reduction to, for example, 1/1.556 fold, of all the gear ratios of the first to six speeds and the reverse speed, and is therefore able to convert the output rotational speed of an engine that outputs high torque at low rotational speeds, to a desired rotational speed, and to transfer it to the drive wheels. Because the torque assignments to the first to third sun gears S1 to S3, the first carrier C1, the first ring gear R1, the common carrier C2, C3, and the common ring gear R2, R3, and the torque assignments to the first to third clutches C-1 to C-3, the first and second brakes B-1, B-2, and the one-way clutch F-1 all reduced 1/1.556 fold, the sizes of various components and the capacities of clutches and brakes can be made smaller. In particular, in first speed where the transfer torque is large, rotation of the second element can be prevented without using a clutch. Therefore, the need for a clutch of large capacity is eliminated.

The invention claimed is:

1. An automatic transmission comprising:
a transmission case;
an input shaft;
an output shaft;
an intermediate shaft;
a simplex planetary gear set that increases the rotational speed of the input shaft, the simplex planetary gear set including a first carrier directly coupled to the input shaft, a sun gear fixed to the transmission case, and a first ring gear that outputs rotation at the increased speed and that is directly coupled to the intermediate shaft; and
a duplex planetary gear set having first, second, third and fourth elements, and
wherein the first element is selectively coupled to the input shaft via a third clutch and is selectively fixed via a first brake;
wherein the second element is selectively coupled to the intermediate shaft via a second clutch and is selectively fixed via a second brake;
wherein the third element is directly coupled to the output shaft;
wherein the fourth element is selectively coupled to the input shaft via a first clutch; and
wherein the duplex planetary gear set includes second and third sun gears, a long pinion directly in mesh with the second sun gear and meshing with the third sun gear via an intermediate pinion, a common carrier that supports the long pinion and the intermediate pinion, and a common ring gear that meshes with the long pinion, and wherein the second sun gear is the first element, the common carrier is the second element, the common ring gear is the third element, and the third sun gear is the fourth element.

2. The automatic transmission according to claim 1, wherein the duplex planetary gear set is formed of two simplex planetary gear sets, and has four rotary elements with two different rotary elements of one simplex planetary gear set always connected to two different rotary elements of the other simplex planetary gear set.

3. The automatic transmission according to claim 1, wherein the input shaft and the output shaft are journaled on the transmission case for rotation on a common axis, wherein the intermediate shaft has a support shaft portion formed at a distal end, and wherein the intermediate shaft is rotatably supported by insertion of the support shaft portion into a journal hole that is bored in an end of the input shaft, for rotation relative to and coaxial with the input shaft.

4. The automatic transmission according to claim 3, wherein the duplex planetary gear set is formed of two simplex planetary gear sets, and has four rotary elements with two different rotary elements of one simplex planetary gear set always connected to two different rotary elements of the other simplex planetary gear set.

5. The automatic transmission according to claim 3, wherein:
the simplex planetary gear set includes a first sun gear, a first carrier supporting a pinion in mesh with the first sun gear, and a first ring gear in mesh with the pinion, wherein the first carrier is the input element, the sun gear is the fixed element, and the first ring gear is the speed-increasing element, and
wherein the duplex planetary gear set includes second and third sun gears, a long pinion directly in mesh with the second sun gear and meshing with the third sun gear via an intermediate pinion, a common carrier that supports the long pinion and the intermediate pinion, and a common ring gear that meshes with the long pinion, and wherein the second sun gear is the first element, the common carrier is the second element, the common ring gear is the third element, and the third sun gear is the fourth element.

6. The automatic transmission according to claim 3, wherein the intermediate shaft passes through the duplex planetary gear set, and extends beyond the duplex planetary gear set to an end portion journaled on the transmission case for rotation on the common axis.

7. The automatic transmission according to claim 6, wherein the duplex planetary gear set is formed of two simplex planetary gear sets, and has four rotary elements with two different rotary elements of one simplex planetary gear set always connected to two different rotary elements of the other simplex planetary gear set.

8. The automatic transmission according to claim 6, wherein:
the simplex planetary gear set includes a first sun gear, a first carrier supporting a pinion in mesh with the first sun gear, and a first ring gear in mesh with the pinion, wherein the first carrier is the input element, the sun gear is the fixed element, and the first ring gear is the speed-increasing element, and the duplex planetary gear set includes of second and third sun gears, a long pinion directly in mesh with the second sun gear and meshing with the third sun gear via an intermediate pinion, a common carrier that supports the long pinion and the intermediate pinion, and a common ring gear that meshes with the long pinion, and wherein the second sun gear is the first element, the common carrier is the second element, the common ring gear is the third element, and the third sun gear is the fourth element.

9. The automatic transmission according to claim 1, wherein the first and third clutches are disposed in the vicinity of the simplex planetary gear set.

10. The automatic transmission according to claim 3, wherein the simplex planetary gear set includes a carrier that is the input element and that is coupled via a member that protrudes radially from an end portion of the input shaft, a sun gear that is the fixed element and that is coupled via an axially extending fixing member coupled to the transmission case, and a ring gear that is the speed-increasing element, wherein the ring gear and the intermediate shaft are coupled via a coupling member including a radially extending portion that extends radially inward from the ring gear, and an axially extending portion that extends axially from the radially extending portion, wherein the axially extended portion has a coupling portion, for coupling to the intermediate shaft, and a supply portion that supplies oil pressure to a hydraulic servo of a friction engagement element, and wherein the coupling portion is disposed on a side of the supply portion which is axially opposite the support shaft portion.

11. The automatic transmission according to claim 10, wherein the fixing member surrounds the outer periphery of the input shaft, and an oil passage in communication with the supply portion is formed in the fixing member, the input shaft, and the intermediate shaft, and operating oil for the hydraulic servo is supplied via the oil passage.

12. The automatic transmission according to claim 11, wherein a lubricating oil passage for supplying a lubricating oil to elements disposed within the transmission case is formed in the transmission case and the intermediate shaft.

13. The automatic transmission according to claim 10, wherein a lubricating oil passage for supplying a lubricating oil to elements disposed within the transmission case is formed in the transmission case and the intermediate shaft.

14. The automatic transmission according to claim 1, wherein the simplex planetary gear set includes a carrier as the input element, a sun gear as the fixed element, a ring gear as the speed-increasing element, and a hub member that extends axially from the carrier at an outer periphery of the simplex planetary gear set, wherein the carrier is formed of a carrier body and a carrier cover, and wherein a cutout for inserting the pinion is formed in the carrier cover.

15. The automatic transmission according to claim 3, wherein the simplex planetary gear set includes a carrier as the input element, a sun gear as the fixed element, a ring gear as the speed-increasing element, and a hub member that extends axis from the carrier at an outer periphery of the simplex planetary gear set, wherein the carrier is formed of a carrier body and a carrier cover, and wherein a cutout for inserting the pinion is formed in the carrier cover.

16. The automatic transmission according to claim 15, wherein a plurality of cutouts are formed in a radially inward side wall of the carrier cover, point-symmetrically about the common axis.

17. The automatic transmission according to claim 14, wherein a plurality of cutouts are formed in a radially inward side wall of the carrier cover, point-symmetrically about the common axis.

18. The automatic transmission according to claim 14, wherein the simplex planetary gear set includes a carrier as the input element, a sun gear as the fixed element, a ring gear as the speed-increasing element, and a hub member that extends axially from the carrier at an outer periphery of the simplex planetary gear set, and wherein the carrier and the hub member are formed as separate bodies, and are restricted axially and rotationally by a snap ring and splines, respectively.

19. The automatic transmission according to claim 15, wherein the simplex planetary gear set includes a carrier as the input element, a sun gear as the fixed element, a ring gear as the speed-increasing element, and a hub member that extends axially from the carrier at an outer periphery of the simplex planetary gear set, and wherein the carrier and the hub member are formed as separate bodies, and are restricted axially and rotationally by a snap ring and splines, respectively.

20. The automatic transmission according to claim 14, wherein the simplex planetary gear set includes a carrier as the input element, a sun gear as the fixed element, a ring gear as the speed-increasing element, and a hub member that extends axially from the carrier at an outer periphery of the simplex planetary gear set, wherein the carrier and the hub member are formed as a single integral body, and wherein a hole for inserting the pinion is formed in the hub member.

21. The automatic transmission according to claim 15, wherein the simplex planetary gear set includes a carrier as the input element, a sun gear as the fixed element, a ring gear as the speed-increasing element, and a hub member that extends axially from the carrier at an outer periphery of the simplex planetary gear set, wherein the carrier and the hub member are formed as a single integral body, and wherein a hole for inserting the pinion is formed in the hub member.

* * * * *

UNITED STATES PATENT AND TRADEMARK OFFICE
CERTIFICATE OF CORRECTION

| | | |
|---|---|---|
| PATENT NO. | : 8,100,809 B2 | Page 1 of 1 |
| APPLICATION NO. | : 11/658912 | |
| DATED | : January 24, 2012 | |
| INVENTOR(S) | : Takao Taniguchi et al. | |

It is certified that error appears in the above-identified patent and that said Letters Patent is hereby corrected as shown below:

Claim 8, column 19, line 5, after "includes", delete "of".

Signed and Sealed this
Third Day of April, 2012

David J. Kappos
*Director of the United States Patent and Trademark Office*